United States Patent
Acikalin et al.

(10) Patent No.: US 10,670,523 B2
(45) Date of Patent: Jun. 2, 2020

(54) PARTICULATE MATTER MEASUREMENT USING LIGHT SHEET GENERATION AND SCATTERING ANALYSIS

(71) Applicant: INTEL CORPORATION, Santa Clara, CA (US)

(72) Inventors: Tolga Acikalin, San Jose, CA (US); Shengbo Xu, Newark, CA (US); Melissa A. Cowan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 682 days.

(21) Appl. No.: 15/132,452

(22) Filed: Apr. 19, 2016

(65) Prior Publication Data

US 2017/0299510 A1 Oct. 19, 2017

(51) Int. Cl.
*G01N 21/53* (2006.01)
(52) U.S. Cl.
CPC ..... *G01N 21/53* (2013.01); *G01N 2201/0612* (2013.01); *G01N 2201/0633* (2013.01)
(58) Field of Classification Search
None
See application file for complete search history.

(56) References Cited

U.S. PATENT DOCUMENTS

| 4,111,558 A * | 9/1978 | Ikemori | G02B 13/04 |
| | | | 359/708 |
| 4,321,551 A * | 3/1982 | Bleil | H01S 3/2308 |
| | | | 359/343 |

(Continued)

FOREIGN PATENT DOCUMENTS

| CN | 201805141 U | 4/2011 |
| WO | 2017/052721 A1 | 3/2017 |
| WO | 2017/184275 A2 | 10/2017 |

OTHER PUBLICATIONS

International Preliminary Report on Patentability received for PCT Application No. PCT/US2017/022731, dated Oct. 23, 2018. 6 pages.

(Continued)

*Primary Examiner* — Kara E. Geisel
*Assistant Examiner* — Jarreas C. Underwood
(74) *Attorney, Agent, or Firm* — Finch & Maloney PLLC

(57) ABSTRACT

Techniques are disclosed for particulate matter (PM) measurement in a medium (such as air) using flat-top intensity laser sheet beam generation. The techniques for generating the laser sheet beam may include nonspecialized optical elements (e.g., aspherical, spherical, biconvex, and/or cylindrical lenses) that are cost-effective, reduce the overall footprint of the system, and also provide for relatively increased power efficiencies compared to conventional techniques. The PM measurement system may use the laser sheet beam generated in combination with a medium flow channel to pass the medium through the laser sheet beam, thereby causing particulates within the medium to scatter light, which can be detected using a light sensor (e.g., a photodetector). The scattered light signals can then be analyzed to match them with corresponding particulate sizes and the amount of signals per particulate size can also be determined to measure the size and count of particulates within the medium.

25 Claims, 7 Drawing Sheets

(56) References Cited

U.S. PATENT DOCUMENTS

| | | | | |
|---|---|---|---|---|
| 4,842,406 A | * | 6/1989 | VonBargen | G01N 15/0205 356/336 |
| 4,848,882 A | * | 7/1989 | Suzuki | G02B 6/425 359/652 |
| 5,218,476 A | * | 6/1993 | Ito | G02B 15/167 359/676 |
| 5,373,395 A | | 12/1994 | Adachi | |
| 5,426,501 A | * | 6/1995 | Hokanson | G01N 15/1456 250/222.2 |
| 5,528,408 A | * | 6/1996 | McGinley | G02B 6/4292 398/135 |
| 6,066,245 A | * | 5/2000 | Trost | G01N 21/645 204/461 |
| 6,246,524 B1 | | 6/2001 | Tanaka | |
| 6,252,661 B1 | * | 6/2001 | Hanna | G01B 11/2425 356/394 |
| 6,365,109 B1 | * | 4/2002 | Jeng | G01N 21/05 356/246 |
| 6,809,820 B2 | * | 10/2004 | Snelling | G01N 21/71 356/315 |
| 6,943,964 B1 | * | 9/2005 | Zhang | G02B 27/0927 359/708 |
| 7,400,457 B1 | * | 7/2008 | Cayer | G02B 27/0927 359/709 |
| 8,520,205 B2 | * | 8/2013 | Silcott | G01N 15/0618 356/318 |
| 9,285,593 B1 | * | 3/2016 | Laskin | G02B 27/0927 |
| 9,513,206 B2 | * | 12/2016 | Yamada | G01N 15/1436 |
| 9,927,620 B2 | | 3/2018 | Xu et al. | |
| 2002/0024688 A1 | * | 2/2002 | Ogasawara | G02F 1/134309 359/16 |
| 2006/0008227 A1 | * | 1/2006 | Schmidt | G01N 21/0303 385/129 |
| 2008/0144194 A1 | * | 6/2008 | Tanaami | G02B 27/0927 359/794 |
| 2013/0308122 A1 | * | 11/2013 | Merchez | G01N 15/147 356/72 |
| 2014/0247451 A1 | * | 9/2014 | Graves | G01N 15/147 356/338 |
| 2015/0160468 A1 | | 6/2015 | Ma et al. | |
| 2015/0177593 A1 | * | 6/2015 | Smeeton | G02F 1/37 362/259 |
| 2017/0082861 A1 | | 3/2017 | Xu et al. | |

OTHER PUBLICATIONS

PCT Search Report and Written Opinion for PCT Application No. PCT/US2017/022731 dated Jun. 23, 2017, 10 pages.

International Preliminary Report on Patentability received for PCT Application No. PCT/US2016/042447, dated Apr. 5, 2018. 12 pages.

International Search Report and Written Opinion received for Patent Application No. PCT/US2016/042447, dated Oct. 19, 2016. 15 pages.

Laskin, Alexander, "Solutions for Beam Shaping, Control of laser intensity profile and spot shape with refractive beam shaping," LTJ, Jan. 2013, No. 1. pp. 37-40.

U.S. Appl. No. 14/859,489, filed Sep. 21, 2015. 26 pages.

U.S. Appl. No. 14/859,489, filed Sep. 21, 2015. 19 pages.

* cited by examiner

PARTICULATE MATTER MEASUREMENT USING LIGHT SHEET GENERATION AND SCATTERING ANALYSIS

BACKGROUND

A laser is a device that emits light through a process of optical amplification based on the stimulated emission of electromagnetic radiation. A laser differs from other sources of light in that it emits light coherently. Spatial coherence allows a laser to be focused to a tight spot, enabling applications such as laser cutting and lithography. Although there are different spatial modes for laser light, the most common is the TEM00 mode in which laser light is generated with a Gaussian intensity profile. A Gaussian intensity profile or Gaussian beam has transverse electric field and intensity (irradiance) distributions that are well approximated by Gaussian functions.

BRIEF DESCRIPTION OF THE DRAWINGS

FIG. 4A illustrates a conventional system for generating a flat-top intensity laser sheet beam that utilizes substantial beam clipping as shown, and FIG. 4B illustrates an example system according to an embodiment herein using nonspecialized optic elements for generating a flat-top intensity laser sheet beam that utilizes minimal to no beam clipping.

DETAILED DESCRIPTION

Figure 1A:
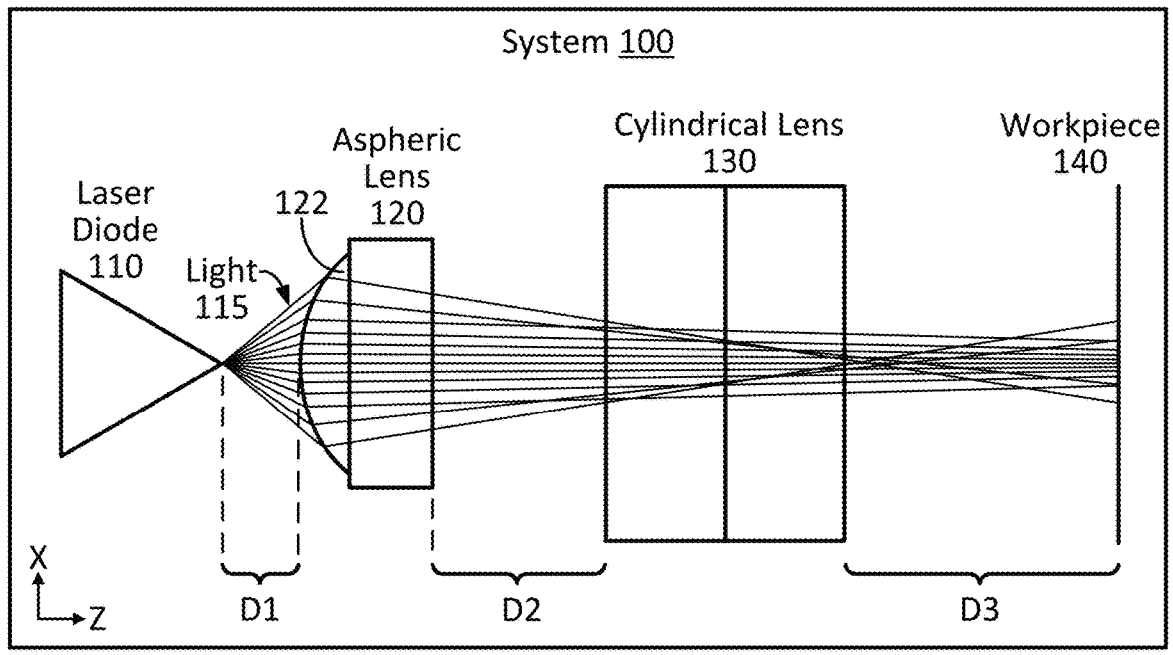
FIGS. 1A-B illustrate an example system for flat-top intensity laser sheet beam generation, in accordance with some embodiments of the present disclosure.

Techniques are disclosed for particulate matter (PM) measurement in a medium (such as air) using light sheet generation. The techniques can be implemented in a relatively low cost and small, portable PM measurement system suitable for personal use. In some example cases, the system includes componentry for generating a flat-top intensity laser sheet beam. The componentry may include, for instance, a source of light (e.g., a laser diode) directed at a first optical component (e.g., an aspherical or spherical or biconvex lens) arranged to receive the light and generate spherical aberration (e.g., third order positive aberration). The system may also include a second optical component (e.g., a cylindrical lens) for focusing the light in a plane and to generate a laser sheet beam or so-called light sheet. The PM measurement system may use the light sheet generated in combination with a medium flow channel to pass the medium through the light sheet, thereby causing particulates within the medium to scatter light as those particulates pass through the sheet. The scattered light can be detected using a light sensor (e.g., a photodetector) also included in the system. Each scattered light signal effectively has a signature that can be correlated to a particulate size. The correlation can be determined, for instance, either empirically or based on theoretical analysis. In any case, each scattered light signal can then be analyzed to match it with a corresponding particulate size. In addition, the amount of scattered light signals corresponding to any one particulate size (or range) can also be determined, by tallying those signals. Thus, the PM measurement system can be configured to measure both the size and number of particulates within the medium. The concentration of PM in the medium can then be calculated using the flow rate of the medium and the flow channel geometry. The componentry for generating the laser sheet beam can be implemented with nonspecialized optical elements that are cost-effective, reduce the working distance and overall volume/footprint of the system, and also provide for relatively increased power efficiencies as compared to conventional techniques used to make the laser sheet beam. As can be understood based on this disclosure, those benefits of the techniques for generating the light sheet may be translated to the PM measurement system including such techniques to, for example, enable portable and/or wearable applications that allow users to assess PM levels (for health reasons, for lab-based experimental or analytical reasons, or any other reason). Numerous variations and configurations will be apparent in light of this disclosure.

General Overview

Particulate matter (PM) levels in air are regulated by environmental government agencies around the world. These agencies set the limits of allowable PM levels in air and endeavor to issue hazard levels depending on particulate matter levels at any given time. Air pollution due to particulate matter is a concern, particularly in the developing world, given the impact on the health of people breathing the particulate-laden air. Particulate matter level hazard categories also depend on the size of the particulate matter. For example, the U.S. Environmental Protection Agency (EPA) categorizes coarse particles as 10 microns in diameter or smaller, and fine particles as 2.5 microns in diameter or smaller. Particulate matter is typically referred to based on its size, where 'PMx' denotes the size of the particulate matter with x representing the maximum diameter of such particulate matter in microns. Therefore, coarse particles are known as PM10 and fine particles are known as PM2.5. Currently, PM2.5 levels are of concern due to their impact on respiratory, cardiovascular, and neurovascular disease, for example. In the developing world, it is common for governments to issue health warnings due to excessive PM2.5 levels, especially in the winter season. PM2.5 particulates pose a greater health risk due to their smaller size, making them relatively more difficult for the human body to filter out (e.g., as compared to PM10 particulates) and allowing for such fine particles to potentially enter into the body's circulation. Current devices or systems that utilize optical detection methodologies for measuring PM levels in air have numerous drawbacks. Example drawbacks include: being too large to be practically portable, lacking battery operation, unsuitability for battery operation due to high power consumption, being expensive to manufacture or use, and having limits in particulate size measurement, to name a few.

Thus, and in accordance with one or more embodiments of the present disclosure, techniques are provided for particulate matter (PM) measurement using light sheet generation. As will be apparent in light of this disclosure, in some embodiments, PM measurement includes determining particle size and/or assessing particle levels in a medium, such as a gas (e.g., air), a liquid (e.g., water), or a gel (e.g., hydrogels). As previously described, the most common laser spatial mode is the TEM00 mode, which delivers a laser beam with a Gaussian profile. To achieve a light sheet, the original laser profile, such as the Gaussian profile of a TEM00 mode laser, has to be converted to the desired profile, which may include a flat-top intensity laser sheet profile, in some embodiments. Current techniques for achieving flat-top intensity laser profiles generally require complicated, customized elements (such as absorbing lenses, binary phase gratings, deformable mirrors, and specialized diffractive optics) that are difficult to manufacture and are therefore costly and less available for widespread adoption and use. Moreover, the complicated, customized elements also require long working distances to achieve the desired flat-top intensity laser sheet profile. Therefore, componentry suitable for flat-top intensity laser sheet beam generation is disclosed herein. In some embodiments, the componentry can be used to generate a light sheet which in turn can be used for measuring particulate matter levels in a medium, based on light scattered as particulates pass through the sheet. To this end, and according to some such embodiments, a PM measurement system is provided wherein the componentry for flat-top intensity laser sheet beam generation is used in combination with one or more light sensors (such as one or more photodetectors) and a device for moving the medium across the laser sheet beam (such as an air moving device, where the medium is air) to measure particulate matter levels in the medium.

In some embodiments, a system for flat-top intensity laser sheet beam generation can be achieved using nonspecialized elements that effectively decrease the cost of achieving the laser profile and can also allow for smaller form factors compared to other systems. Such nonspecialized elements as used herein in combination with techniques/systems for light sheet (e.g., flat-top intensity laser sheet beam) generation include, for example, spherical, aspherical, biconvex, and cylindrical optical lenses, or a combination of such lenses. These nonspecialized elements are relatively low cost compared to specialized elements used in other techniques for flat-top intensity laser sheet beam generation, such as absorbing lenses, binary phase grating, deformable mirrors, and specialized diffractive optics, to provide a few examples. As previously described, such specialized elements are complicated and highly customized, making the specialized elements difficult and costly to manufacture. In addition, systems that use such specialized elements have a larger size/volume/form factor compared to the flat-top intensity laser sheet beam generation systems described herein, due to the smaller diameters and short working distances of the nonspecialized optical elements, for example. Further, the systems described herein according to some embodiments are more efficient than other systems, and thus they use relatively less power, making them practical for battery powered applications. All of the benefits and advantages of the systems for flat-top intensity laser sheet beam generation using nonspecialized elements described herein can be realized in the PM measurement systems also described herein, as will be apparent in light of this disclosure. For example, the relatively small volume/form factor and relatively lower power consumption of a flat-top intensity laser sheet beam generation system using nonspecialized elements may enable PM measurement systems suitable for portable and/or wearable applications. The applications can be, for instance, medical applications such as for assessing the quality of the ambient air being breathed, or manufacturing applications such as for assessing particulates within a clean room environment (e.g., wafer fabrication facility), or scientific application such as for assessing particulates within a given medium (e.g., air, fluid, or other flowable medium capable of carrying particulates), to name a few example applications.

In some embodiments, a flat-top intensity laser sheet profile is achieved by taking a Gaussian profile laser source and using a third order positive aberration to acquire uniform intensity along the laser sheet length direction, in combination with compressing the laser intensity profile in the sheet thickness direction. In some embodiments, a system for generating such a flat-top intensity laser sheet profile may include a laser diode, an aspherical (or spherical or biconvex) lens, and a cylindrical lens. In some such embodiments, the laser diode provides the Gaussian profile laser source (e.g., operating in TEM00). Further, in some such embodiments, the aspherical (or spherical or biconvex) lens can generate third order positive aberration on the laser source, which can be achieved by aligning the lens with the laser diode and having the aspherical/ball side of the lens face the laser diode to receive the Gaussian profile laser source. As can be understood based on this disclosure, the third order positive aberration caused by the aspherical lens creates a collimated beam with positive aberrations only in a single plane. Spherical aberration (such as third order positive aberration) is typically avoided in laser systems due to the lack of focus created. However, in the systems described herein according to some embodiments, the spherical aberration can be used to help achieve the desired flat-top intensity laser profile, as will be apparent in light of this disclosure. Further still, in some such embodiments, the cylindrical lens can receive the beam from the aspherical lens to focus the beam in another plane and to thereby create a flat-top intensity laser sheet. The specific profile of the laser sheet generated may depend on various factors, such as the laser output divergence angles, the laser focal length, the laser size, and the amount of third order aberration caused by the first lens (e.g., by the aspherical or spherical or biconvex lens). In other words, the aspherical (or spherical or biconvex) lens can be used to generate a flat-top laser profile using spherical aberration, and the cylindrical lens can be used to generate a light sheet by focusing the laser in only one direction, where the combination of the two achieves the desired flat-top intensity laser sheet profile, as will be apparent in light of this disclosure.

In some embodiments, the techniques described herein can be used for particulate matter (PM) measurement. In some such embodiments, the techniques are implemented as a PM measurement system that includes a sub-system described herein for flat-top intensity laser sheet beam generation to generate a light sheet. Utilizing a uniform intensity beam, such as a flat-top intensity laser light sheet, can help ensure that particulate scattering is based only on the diameter of the particulate, and is not affected by the light beam itself. For example, in the case of a Gaussian (non-uniform) beam profile, the scattered light energy from a particulate in a PM measurement system would be based on not only the diameter of the particulate, but also the crossing location of the particulate with the Gaussian laser beam profile, due to the beam not having a uniform intensity in the sheet direction, thereby causing the particulate to scatter more light when crossing the centerline of the beam versus crossing toward the edge of the beam. In some embodiments, the PM measurement system further includes a device for moving the medium being measured across the light beam, such as an air moving device in the case of the medium being air, which may include a positive air pressure device (e.g., a fan or piezoelectric diaphragm) to blow the air through the light and/or a negative air pressure device (e.g., a reverse fan or vacuum) to suction the air through the light, for example. In some such embodiments, as particles in the medium cross the light sheet, the light energy is scattered corresponding to the diameter of the particulate matter. In some embodiments, the PM measurement system further includes one or more light sensor devices, such as one or more photodetectors, to receive light energy scattered by particulate matter crossing the light sheet. In some such embodiments, one or more optional optical devices, such as one or more lenses, may be used in the system to assist with directing scattered light energy to the light sensor. In some embodiments, the PM measurement system includes electrical circuitry for converting the light sensor signals generated based on the scattered light energy into voltage signals, which can be analyzed to determine PM size and/or quantity. In some embodiments, the PM measurement system may be operatively coupled to a controller (e.g., microcontroller) and/or processor (e.g., microprocessor) to process the voltage signals generated based on the PM measurements and to generate data relating to the size and/or quantity of the particulates within the medium being tested. In some embodiments, one or more components of the PM measurement system may be contained in a housing, as will be described in more detail herein.

In some embodiments, the techniques for PM measurement may derive numerous benefits from using a flat-top intensity laser sheet beam generated as described herein. For example, the shorter work distances and smaller overall volume needed for such laser sheet beam generation systems described herein may translate to a smaller, more compact PM measurement system (e.g., as compared to other PM measurement systems). Further, the cost-effectiveness of the laser sheet beam generation systems described herein may translate to a more cost-effective PM measurement system (e.g., as compared to other PM measurement systems). Further still, the efficiency of the laser sheet generation systems described herein may translate to a PM measurement system with increased power-efficiency (e.g., as compared to other PM measurement systems). In addition, the use of the PM measurement techniques described herein may be able to measure small particulates (e.g., particulates less than 2.5 or 1 micron in size) and also distinguish between particulates with relatively high precision (e.g., being able to distinguish between particles that differ by 0.05, 0.1, 0.15, 0.2, 0.25, 0.3, 0.35, 0.4, 0.45, or 0.5 microns in size). In some embodiments, the PM measurement techniques described herein may be able to measure particles in the range of 0.1 to 100 microns (e.g., 0.3 to 10 microns), or any other suitable particle size as will be apparent in light of this disclosure. For instance, in some such embodiments, higher laser powers and/or larger signal amplifications may be used to assist in measuring particles having a diameter smaller than 0.3 microns. Further, in some such embodiments, the system may be configured to measure particles having a diameter larger than 10 microns, for example, depending on the end use or target application. Accordingly, the PM measurement techniques described herein enable a compact, low-power device that can size and count particulates. An example application for such a PM measurement system (having low power, small form factor platforms) is to enable personal air quality measurement devices to monitor the particulate levels in air. Such an example device may be implemented as part of a portable and/or wearable electronics platform, which may include integration with items such as a watch, badge, keychain, table top unit, belt, shoe, head worn accessory, and apparel, to name a few examples. In some instances, such a device may be implemented as part of an internet of things (IOT) platform or solution (e.g., an environmental monitoring platform such as a smart city scheme or an industrial worker safety platform).

The techniques described herein can be detected in any suitable manner. For example, for detection of the flat-top intensity laser sheet beam generation system, configured in accordance with some embodiments, visual inspection and/or reverse engineering can be used to determine if such a system includes, for instance, a laser diode, an aspherical lens, and a cylindrical lens in series. Further, a system used to measure particulate matter according to some embodiments may also include an air flow device and one or more light sensors (e.g., photodetectors). Further still, the system may be operatively coupled to electrical circuitry, which may include a controller (e.g., microcontroller) and/or processor (e.g., microprocessor), to process the particulate matter readings, to control the laser diode, to control the air moving device, and/or to manipulate the data gathered to determine the size and amount of particles in a given medium, in accordance with some embodiments. Further yet, the system used to measure particulate matter may be included in a housing that assists with the PM measuring process, such as by substantially reducing or eliminating airflow within the housing outside of the air flow provided by the air moving device, reducing or eliminating light external to the housing (light not provided by the laser diode in the system), and/or reducing or eliminating undesired reflections from the laser diode light, in accordance with some embodiments. In addition, product literature, advertisements, and other materials can be inspected to determine whether the components of the systems variously described herein are present. In some cases, detection of the techniques/systems described herein may be based on detecting one or more of the benefits described herein. Numerous variations and configurations will be apparent in light of the present disclosure.

Flat-Top Intensity Laser Sheet Beam Generation

Figure 1B:
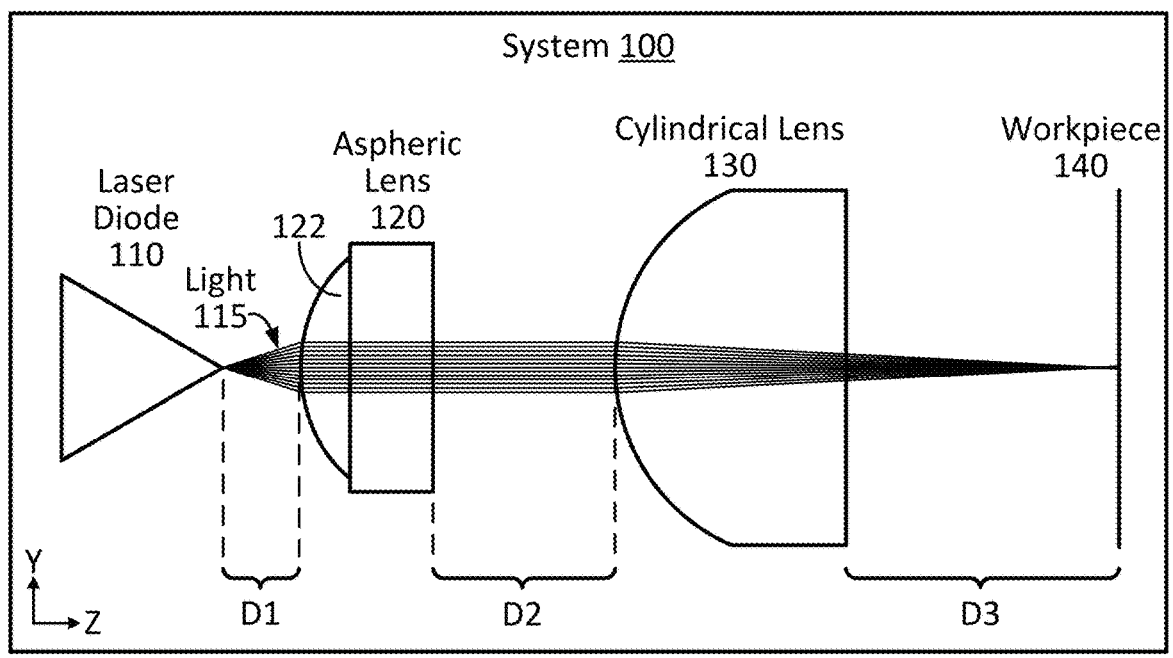

FIGS. 1A-B illustrate an example system 100 for flat-top intensity laser sheet beam generation, in accordance with some embodiments of the present disclosure. Although system 100 is referred to herein as a system including multiple components, system 100 may be a single device including all of the componentry of system 100 as described herein, in accordance with some embodiments. As shown in FIGS. 1A-B system 100 includes a laser diode 110, an aspheric lens 120, a cylindrical lens 130, and a workpiece 140. FIG. 1A illustrates system 100 in an XZ plane with light 115 ray tracing through the optical elements 120 and 130. FIG. 1B illustrates the system 100 in a YZ plane with the light 115 ray tracing through the optical elements 120 and 130. Note that the YZ plane is perpendicular to the XZ plane. Distance D1 is the distance between the light emitting portion of laser diode 110 and aspheric lens 120, distance D2 is the distance between aspheric lens 120 and cylindrical lens 130, and D3 is the distance between cylindrical lens 130 and workpiece 140. Distances D1, D2, and D3 will also be used to discuss the light 115 in those sections and how the light 115 is affected by optical components 120 and 130. System 100 and the components included therein will be described in more detail below.

In this example embodiment, the light source of system 100 is a laser diode 110. However, in other embodiments, the light source may be some other suitable light source capable of producing laser light. Laser diode 110, in this example embodiment, operates on the fundamental transverse mode or TEM00 mode, thereby emitting a beam that approximates a Gaussian profile. In other embodiments, laser diode 110 may operate in other suitable transverse modes, such as higher-order modes (e.g., TEM01, TEM10, TEM11, TEM02, etc.). The light 115 emitting from laser diode 110 in this example embodiment has two different divergence angles: fast and slow axes. In the example system 100 of FIGS. 1A-B, light 115 is propagating in the +Z direction, as shown. The laser diode 110 is positioned such that there is a relatively larger divergence angle output in the XZ plane (as shown in FIG. 1A) as a result of the faster divergence axis being in the XZ plane. Further, the laser diode 110 is positioned such that there is a relatively smaller divergence angle in the YZ plane (as shown in FIG. 1B) as a result of the slower divergence angle output in the YZ plane. Comparing the light 115 emitted from laser diode 110 in section D1 of FIG. 1A versus section D1 of FIG. 1B, it can be seen that the light 115 diverges faster and has a larger angle output in the XZ plane view of FIG. 1A compared to the YZ plane view of FIG. 1B. This alignment will be relevant to the alignment of cylindrical lens 130, as described in more detail below.

System 100, in this example embodiment, includes two optical components: aspherical lens 120 and cylindrical lens 130. As can be seen in FIGS. 1A-B, aspherical lens 120 is positioned with its aspherical (or ball-shaped or curved) side 122 toward laser diode 110, such that light 115 first passes through the aspherical side 122 of aspherical lens 120. As light 115 passes through aspheric lens 120, it generates spherical aberration, and more specifically third order positive aberration. In this manner, aspherical lens 120 is used in an atypical way (e.g., in an opposite fashion than usual), as spherical aberration is generally avoided due to the lack of focus created. In system 100, the spherical aberration is desired to achieve the flat-top profile of light 115, as the spherical aberration causes the rays of light 115 to make large angles relative to the optical axis of system 100. Such rays making significantly large angles with respect to the optic axis are brought to different foci, as can be seen in FIG. 1A (for example, section D3 shows the rays coming to different foci). In some embodiments, a spherical or biconvex lens can be used in place of aspheric lens 120 in system 100 to create the spherical aberration. However, an aspherical lens oriented as shown in FIG. 1A causes greater spherical aberration compared to a similarly-sized spherical lens, allowing for the working distance to be minimized. The collimated light beam with positive aberrations in the XZ plane (e.g., the light in section D2) then passes through cylindrical lens 130, which only focuses the light 115 in the YZ plane.

Note that although the light 115 is shown in FIG. 1B as perfectly collimated after passing through aspheric lens 120 (e.g., in section D2) such that the light rays are parallel and will spread minimally in the YZ plane as the rays propagate, the present disclosure need not be so limited. In practical applications, it may be difficult or impossible to achieve perfectly collimated light as shown in section D2 of FIG. 1B. For example, in some embodiments, the light in the YZ plane of FIG. 1B may be substantially collimated after passing through aspheric lens 120 such that the rays individually or collectively deviate no more than 0.5, 1, 2, 3, 5, 10, 15, or 20 degrees from exactly parallel, or some other suitable amount, as will be apparent in light of this disclosure. Further, in some embodiments, whether the light is substantially collimated may be measured relative to the diameter of aspheric lens 120, such that substantially collimated means that the rays do not spread past the diameter of the lens 120 before a specific distance, such as before at least 1, 2, 3, 5, 10, or 20 times D1 (the distance between the laser diode 110 and the aspheric lens 120), to provide specific examples, or based on some other suitable relative measurement as will be apparent in light of this disclosure. In some such embodiments, even if the rays spread past the diameter of lens 120, a flat top intensity laser sheet beam can still be generated. However, system 100 may be more efficient in instances where the rays do not spread, or minimally spread, past the diameter of lens 120, as the optical power associated with such rays would be wasted.

In this example embodiment, in the XZ plane illustrated in FIG. 1A, the third order aberration effect is dominant due to the larger laser diode divergence angles in that plane (e.g., as compared to in the YZ plane). As a result, the peripheral rays and paraxial rays do not focus on the same point, causing intensity redistribution and generating the uniform, flat-top profile portion of the flat-top intensity laser sheet beam profile, for example. In the YZ plane illustrated in FIG. 1B, the light beam 115 goes through much less aberration due to orienting the smaller laser diode divergence angles in that plane, and in addition, the light beam in the YZ plane generates a well-focused point where the focal point of the cylindrical lens 130 is located. Accordingly, the cylindrical lens 130 can be used to compress the laser intensity profile in the sheet thickness direction, causing the laser sheet portion of the flat-top intensity laser sheet beam profile, for example. The combination of the flat-top profile in the XZ direction with the uniform, focused point in the YZ direction, allows for a flat-top intensity laser sheet profile to be achieved.

System 100 is highly customizable and configurable, as the components 110, 120, and 130 and the distances D1, D2, and D3 can be selected as desired, as will be apparent in light of this disclosure. For example, various different laser diodes or laser light sources can be used to provide the light source in system 100, and the properties of the light source may be selected based on the desired power, size, and/or application of system 100. In some cases, the laser diode and laser sheet thickness target may dictate the different combinations of lenses that can be chosen. In some cases, the flat-top intensity generation may depend on the combined effect of the laser output divergence angle, focal length, and size and/or amount of third order positive aberration of the first optical component (e.g., of aspherical lens 120). In some cases, distances D1 and D2, as well as the dimensions of components 110, 120, and 130 in the Z dimension may determine the size of system 100. In some such cases, distance D3 may also contribute to the working distance of system 100, as the distance from cylindrical lens 130 to the workpiece 140 may be considered in the overall space needed for system 100. As will be apparent in light of this disclosure, in some embodiments, workpiece 140 may be location through which a medium flows to allow for particulate matter measurement within the medium. In some embodiments, D1 may be 1.5 mm plus or minus 1 mm, D2 may be 2.5 mm plus or minus 1 mm, and D3 may be 4 mm plus or minus 1 mm, to provide some example dimensions. As can be understood based on this disclosure, system 100 has a relatively overall shorter working distance compared to conventional systems used to generate a flat-top intensity laser sheet beam, due to the relatively shorter working distances associated with optical elements 120 and 130. As can also be understood based on this disclosure, system 100 has a relatively smaller footprint compared to conventional systems used to generate a flat-top intensity laser sheet beam, due to the relatively overall shorter working distances of the system 100 and also due to being able to utilize relatively smaller diameter optical elements 120 and 130. Numerous variations and configurations will be apparent in light of the present disclosure.

Figure 2A:
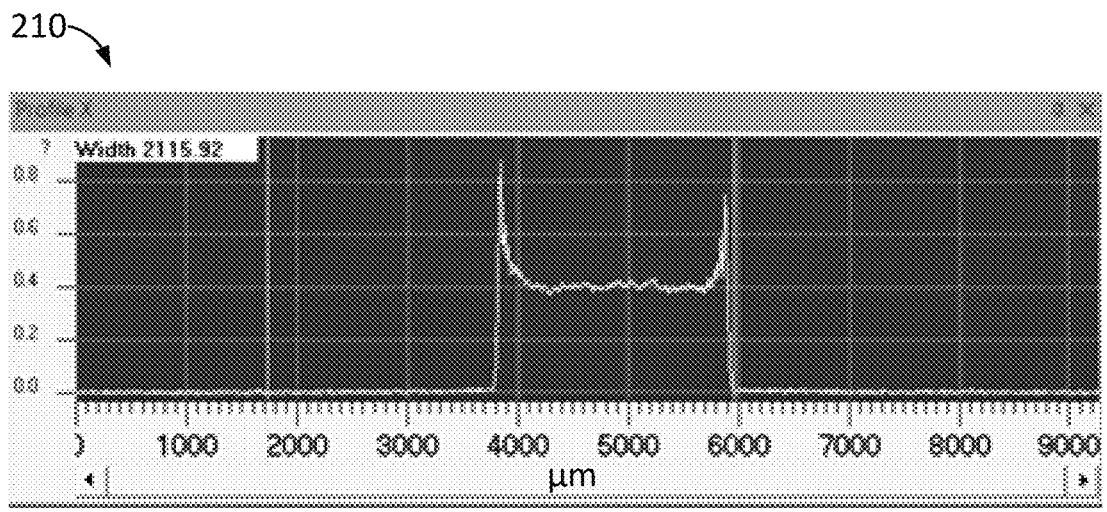
FIGS. 2A-B illustrate example plots showing experimental results validating the flat-top intensity laser sheet generation of the system of FIGS. 1A-B, in accordance with an embodiment of the present disclosure.
Figure 2B:
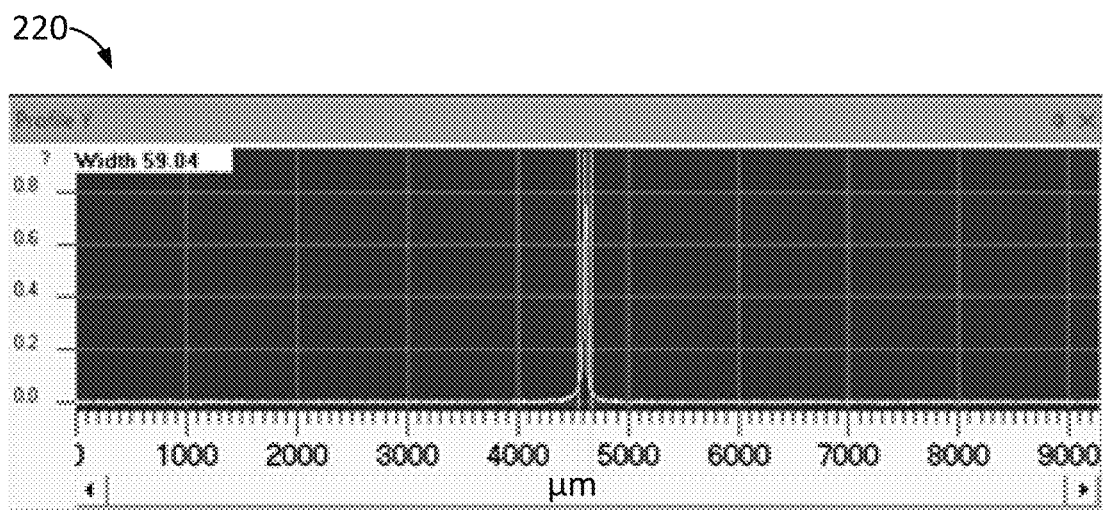

FIGS. 2A-B illustrate example plots 210 and 220 showing experimental results validating the flat-top intensity laser sheet generation of system 100, in accordance with an embodiment of the present disclosure. Plots 210 and 220 were made using a slit based beam scanner to measure the laser beam profile. Plot 210 of FIG. 2A illustrates the laser beam profile in the X-axis and plot 220 of FIG. 2B illustrates a laser beam profile in the Y-axis. The results show a laser sheet having a 2.1 mm×60 microns cross section XY plane size and a flat region in the X direction that covers approximately 2 mm in size (from about 4000 microns to 5800 microns, as can be seen in FIG. 2A). Note that the side peaks shown in plot 210 of FIG. 2A can be removed by clipping (e.g., by passing the beam through an appropriately sized aperture).

Figure 3:
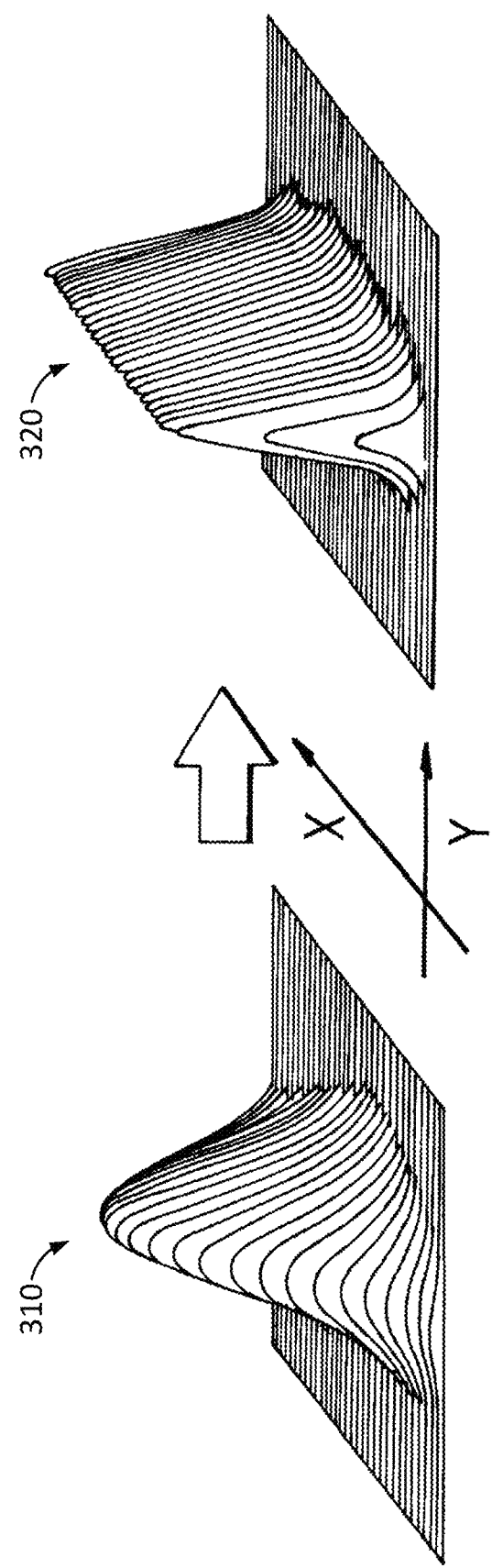
FIG. 3 illustrates laser beam profiles in an XY plane before and after beam shaping using the system of FIGS. 1A-B, in accordance with an embodiment of the present disclosure.

FIG. 3 illustrates laser beam profiles 310 and 330 in an XY plane before and after beam shaping using system 100, in accordance with an embodiment of the present disclosure. Laser beam profile 310 approximates a Gaussian profile, as it is the profile produced by laser diode 110. Laser beam profile 320 is the flat-top intensity laser sheet profile generated by system 100, as a result of laser light from laser diode 110 passing through aspheric lens 120 and then cylindrical lens 130 to cause the beam shaping variously described herein.

Figure 4A:
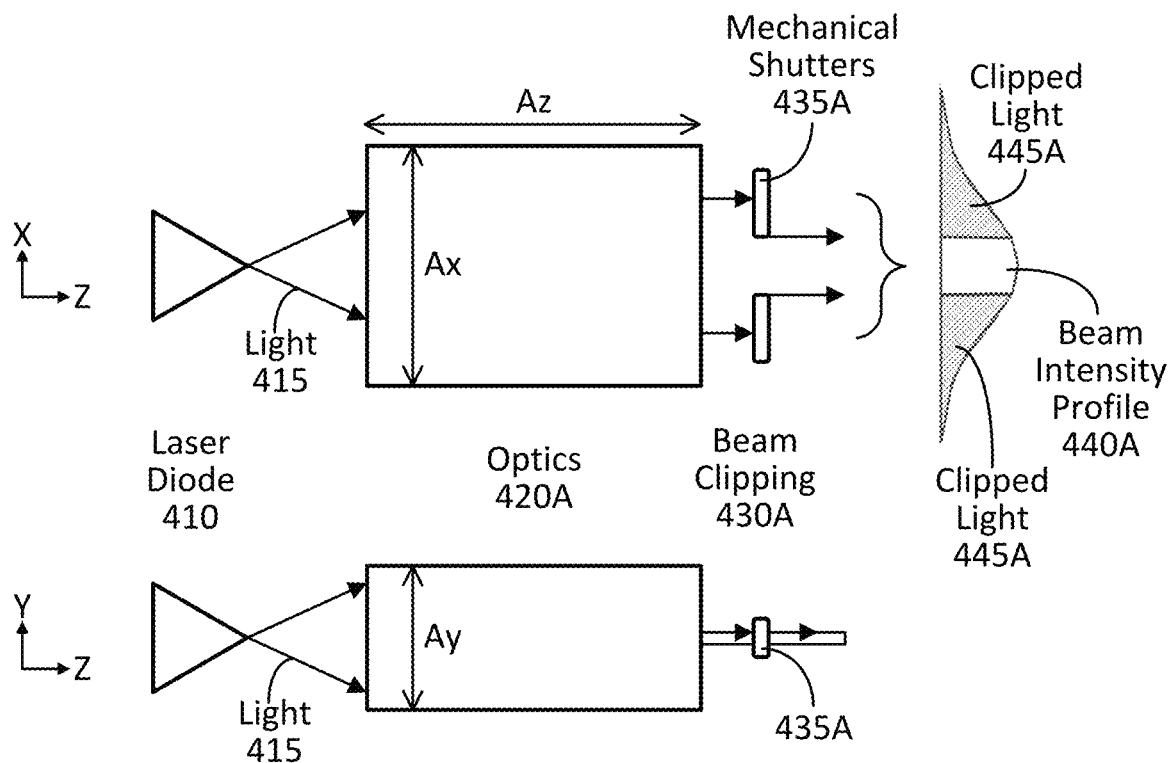
FIGS. 4A-B illustrate the energy efficiency of the techniques described herein for generating a flat-top intensity laser sheet beam as compared to conventional techniques used for generating such a laser sheet beam, in accordance with some embodiments of the present disclosure. Specifically.
Figure 4B:
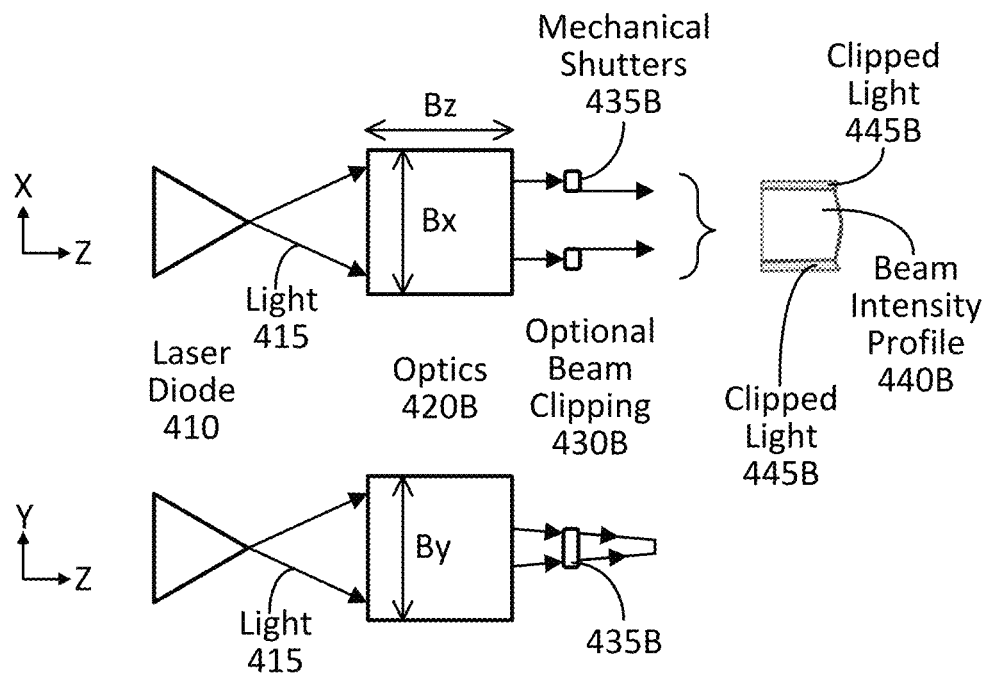

FIGS. 4A-B illustrate the improved energy efficiency of the techniques described herein for generating a flat-top intensity laser sheet beam as compared to conventional techniques used for generating such a laser sheet beam, in accordance with some embodiments of the present disclosure. Specifically, FIG. 4A illustrates a conventional system for generating a flat-top intensity laser sheet beam. As shown in FIG. 4A, the top view is in the XZ plane and the side view is in the YZ plane, with both views showing laser diode 410 and light 415 generated therefrom, optics 420A occupying an area having length Az and width Ax and height Ay, and beam clipping 430A using mechanical shutters 435A to generate flat-top intensity laser sheet beam profile 440A. As can be understood based on FIG. 4A, to generate a laser sheet beam with a uniform intensity, a large beam is generated with a Gaussian intensity profile and only the center section of that beam is used, which is achieved via beam clipping 430A by blocking portions of the beam using mechanical shutters 435A. Although this conventional technique can achieve a flat-top intensity laser sheet beam, it results in substantially large clipped light portions 445A, as shown. Such a conventional method wastes significant amounts of laser/light energy, as the laser diode 410 is one of the largest power consuming components in the system, and thus the system results in lower power efficiencies than can be achieved using the techniques described herein.

FIG. 4B illustrates a system as described herein using nonspecialized optic elements (e.g., an aspherical or spherical or biconvex lens aligned with a cylindrical lens as shown in FIGS. 1A-B) for generating a flat-top intensity laser sheet beam, in accordance with an embodiment. As shown in FIG. 4B, the top view is in the XZ plane and the side view is in the YZ plane, with both views showing laser diode 410 and light 415 generated therefrom, optics 420B occupying an area having length Bz and width Bx and height By, and optional beam clipping 430B using mechanical shutters 435B to generate flat-top intensity laser sheet beam profile 440B. The laser diode 410 and optics 420B in this system may be the same laser diode 110 and optics 120, 130 in the system shown in FIGS. 1A-B and described herein, for example. Such a system allows for a much more energy efficient method of creating a flat-top intensity laser sheet beam (e.g., as compared to the conventional system of FIG. 4A), as minimal to no beam clipping may be used in the system. For example, the beam clipping 430B in the system of FIG. 4B is optional as it need not be included. However, even in embodiments where beam clipping is used to clean the edge effects of the light profile generated (e.g., where clipped light 445B is shown in FIG. 4B), such a system may still achieve energy efficiencies of greater than 75, 80, 85, 90, or 95%, or some other suitable minimum threshold efficiency, as will be apparent in light of this disclosure. As can be understood based on this disclosure, using more efficient beam shaping techniques can significantly reduce the overall power consumption of the system for generating a flat-top intensity laser sheet beam profile. As can also be understood based on this disclosure, such increased efficiencies can be achieved relative to conventional techniques while also achieving a system that is smaller in volume and thus has a smaller footprint. For example, the volume of the optics 420A in the conventional system of FIG. 4A has a volume of (Az)(Ax)(Ay), which is relatively greater than the volume of the system of FIG. 4B that has a volume of (Bz)(Bx)(By). Such a smaller volume or footprint of the system of FIG. 4B may be achieved due to the use of nonspecialized optical elements, which allow for a smaller working distance (e.g., allowing for Bz to be less than Az) and also allow for a smaller width and/or height of the optics portion of the system (e.g., allowing Bx to be less than Ax and/or allowing By to be less than Ay). Numerous other benefits of the techniques used to generate a flat-top intensity laser sheet beam will be apparent in light of this disclosure, and such benefits may be advantageously passed on to PM measurement techniques, such as those described herein, in accordance with some embodiments.

Particulate Matter (PM) Measurement

Figure 5A:
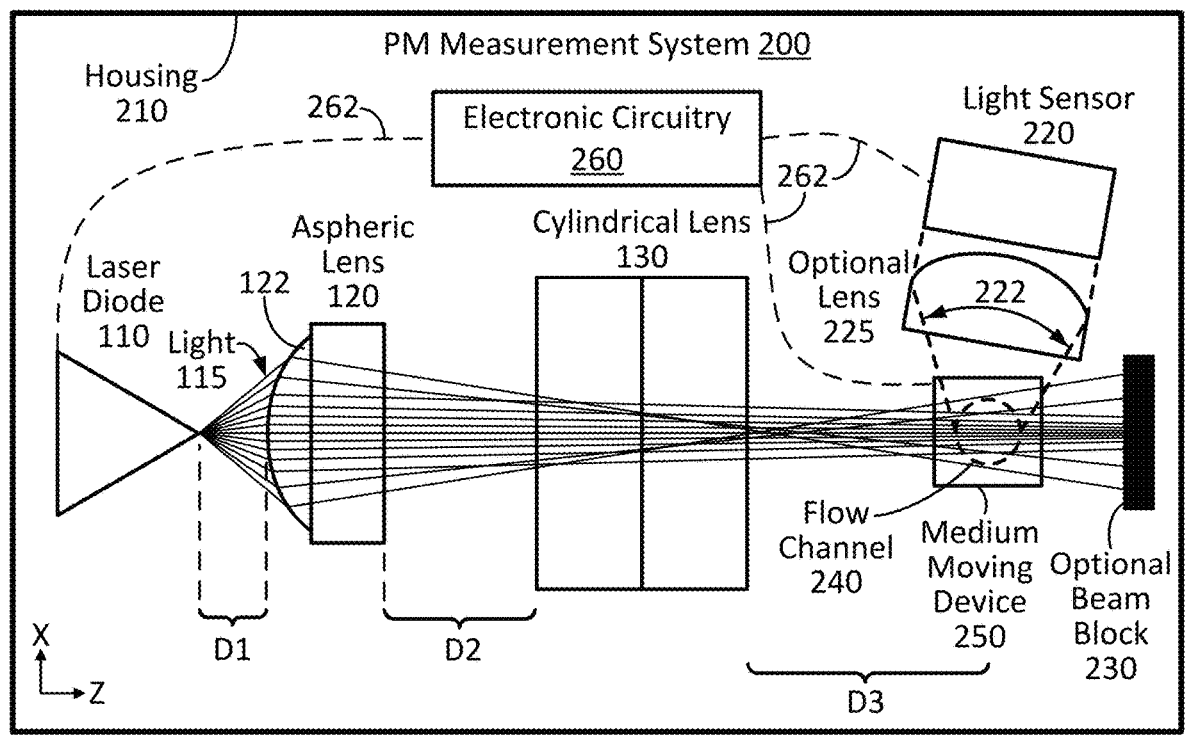
FIGS. 5A-B and 6 illustrate an example system for particulate matter (PM) measurement using light sheet generation, in accordance with some embodiments of the present disclosure. As can be understood in light of this disclosure, the PM measurement system may include the system for flat-top intensity laser sheet beam generation described with reference to FIGS. 1A-B, in accordance with some embodiments, although other embodiments may use other light sheet generation means.
Figure 5B:
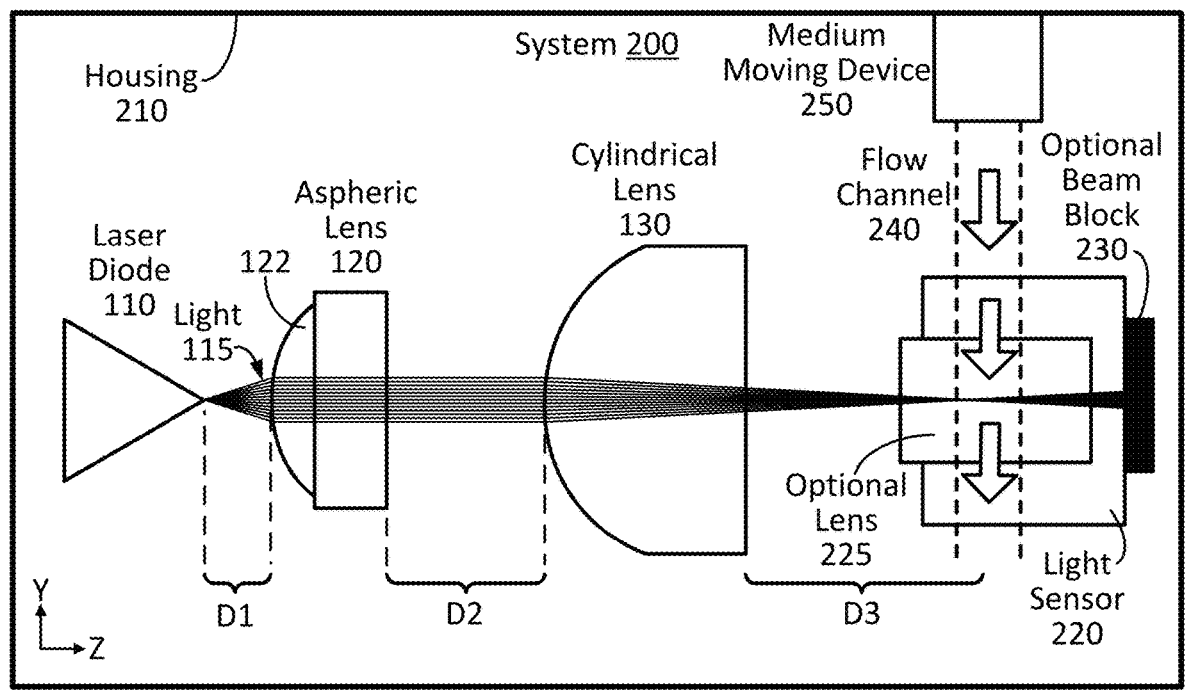
Figure 6:
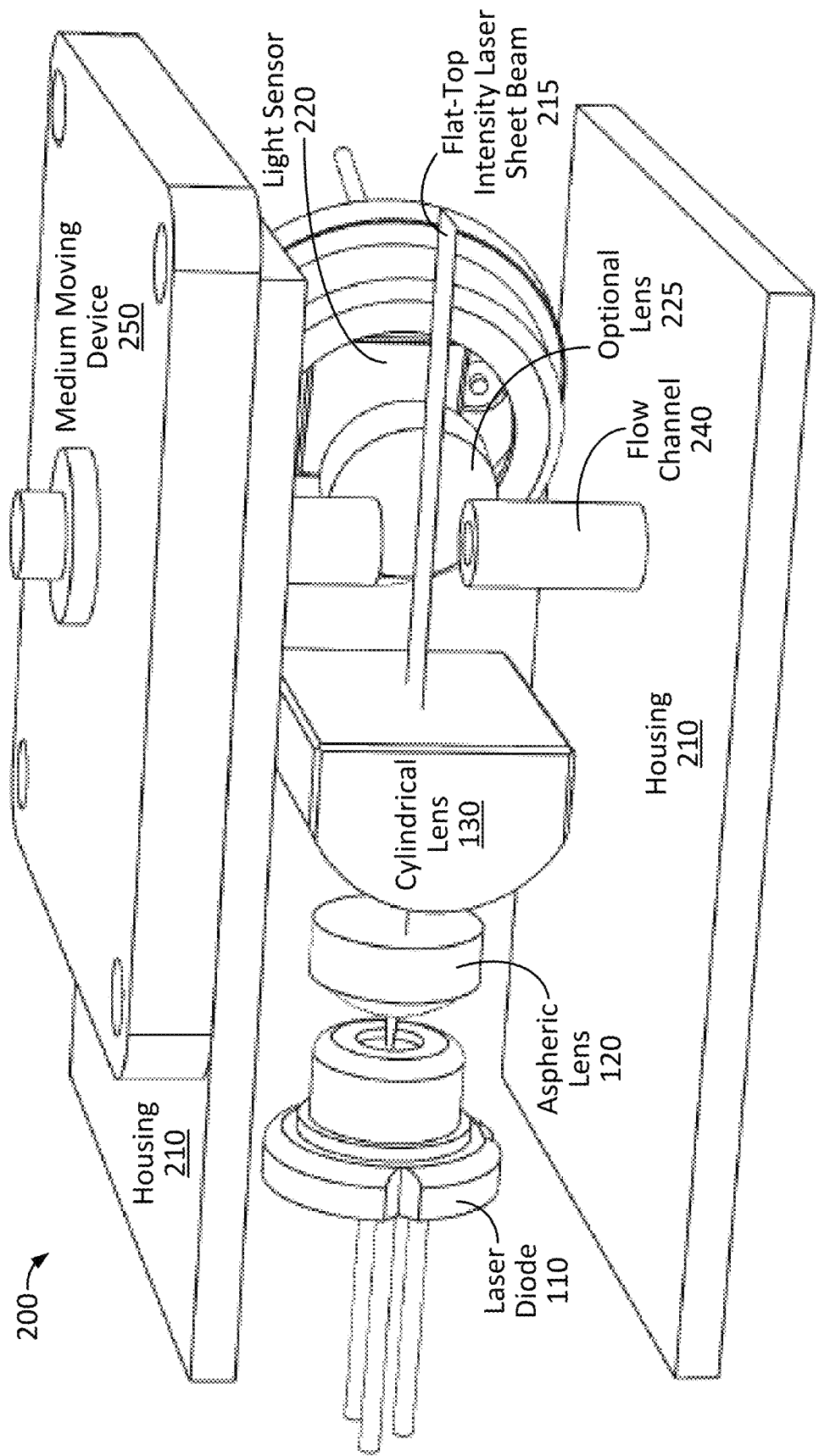

FIGS. 5A-B and 6 illustrate an example system 200 for particulate matter (PM) measurement using light sheet generation, in accordance with some embodiments of the present disclosure. FIG. 6 illustrates the example system 200 of FIGS. 5A-B illustrating Although system 200 is referred to herein as a system including multiple components, system 200 may be a single device including all of the componentry of system 200 as described herein, in accordance with some embodiments. As shown in FIGS. 5A-B, system 200 includes componentry from FIGS. 1A-B (e.g., laser diode 110, aspheric lens 120, and cylindrical lens 130). All previous relevant description related to system 100 herein is equally applicable to system 200, as will be apparent in light of this disclosure. System 200 also includes flow channel 240, beam block 230, light sensor 220, optional optical lens 225, electronic circuitry 260, and housing 210, as shown. As is also shown, electronic circuitry 260 is operatively coupled to laser diode 110 and light sensor 220 using wire connectors 262, in this example embodiment. FIG. 5A illustrates system 200 in an XZ plane with light 115 ray tracing through the optical elements 120 and 130, through flow channel 240, and ending at beam block 230, in this example embodiment. FIG. 5A illustrates the system 200 in the YZ plane, which is perpendicular to the XZ plane. The distances D1, D2, and D3 are the same as discussed herein, with flow channel 240 replacing workpiece 140, as can be understood based on this disclosure. System 200 and the components included therein will be described in more detail below.

As previously described, laser diode 110 and optical elements 120, 130 can be used to generate a flat-top intensity laser sheet beam, which passes through flow channel 240 in example system 200. Flow channel 240, in this example embodiment, provides an external medium, such as a gas (e.g., air), a liquid (e.g., water), and/or a gel (e.g., hydrogel) to system 200, where the medium contains particulates to be measured. For example, in the case of measuring PM levels in air, the flow channel 240 allows for the air to pass through the laser sheet beam 215, such that when a particulate in the air passes the laser sheet beam 215 it scatters the light. Scattered light causes a short duration light pulse in which the duration of the pulse is determined by the particulate travelling speed and the laser sheet beam 215 thickness. Further, the peak intensity of the light pulse may be based on the size of the particulate and the corresponding angle of light scatter caused, and may also be based on the light sensor 220 (e.g., photodetector) angular coverage 222. The light sensor 220 signal can then be converted into a voltage signal using electronic circuitry 260, which may include analog and/or digital circuitry (e.g., an analog-to-digital converter to convert an analog detection signal from the sensor 220 to its digital equivalent). A controller (e.g., microcontroller) and/or processor (e.g., microprocessor) can then digitize the voltage signals (or receive digitized versions of the voltage signals from an analog-to-digital conversion stage) and organize them in different voltage bins, and such controller/processor may be included in electronic circuitry 260. Each voltage bin can correspond to a particulate diameter size or range of diameter sizes, and the number of occurrences of each voltage signal in each bin can be used to determine how many particulates of a given size (or size range) have crossed the light beam 215. Therefore, the number of particulate matter crossings (counts) can be used to determine the concentration level of different sized particulate matter in a medium, such as air, for example.

Flow channel 240, in some embodiments, may include any suitable configuration to allow a medium to pass through flat-top intensity laser sheet beam 215 such that particulate matter in the medium can be measured, as will be apparent in light of this disclosure. In some embodiments, the width of the light sheet 215 can be adjusted by changing the curvature of optic element 120 (e.g., the aspherical lens) and/or optic element 130 (e.g., the cylindrical lens), and/or by changing distance D1 (e.g., between the laser diode and aspherical lens) and/or distance D2 (e.g., between the aspherical and cylindrical lenses). In some embodiments, the width of laser sheet beam 215 (e.g., the dimension perpendicular to the direction of medium flow from flow channel 240) may be greater than the width or diameter of the flow channel 240, thereby ensuring that all of the particulates passing by the light sheet 215 actually cross the light sheet 215 (e.g., as shown in FIG. 5A). Thus, in some such embodiments, system 200 can achieve up to 100% counting efficiency. In some embodiments, the flow channel 240 may have a diameter of 1 mm plus/minus 0.5 mm, or any other suitable size, as will be apparent in light of this disclosure. Note although flow channel 240 is illustrated as being circular in FIGS. 5A-B and 6, the present disclosure is not intended to be so limited. Also note that although arrows are shown in FIG. 5B to indicate the flow channel direction, the present disclosure is not intended to be so limited. For example, as shown in FIG. 5B, the medium moving device 250 is providing positive pressure (e.g., positive air pressure) to move the medium through flow channel 240; however, negative pressure (e.g., negative air pressure) may be alternatively used or used in addition to a positive pressure device, in some embodiments. In embodiments where the medium being measured is a gas, such as air, flow channel 240 may have a tube-like shape that may or may not be open to allow the air to pass from one portion of the channel to the other portion, such as is shown in FIG. 6. In some such embodiments, where the flow channel 240 includes at least one open portion in housing 210, then system 200 may be designed to address any related issues that may arise from such a configuration, such as preventing other/undesired airflow from entering the flow channel 240 (e.g., airflow unrelated to the flow channel) and preventing the medium from flowing out of the flow channel 240. In some embodiments, system 200 may include a configuration (such as a housing 210 configuration) that ensures (or attempts to ensure) a uniform flow of the medium passing through the light sheet 215, such that the particulate matter in the medium only passes through the light sheet 215 once and is thus only measured/counted once. For example, if the flow of the medium through flow channel 240 were to be turbulent, such that the same particulate matter crosses the light sheet 215 more than once, then the accuracy of system 200 may be affected by false readings. In some embodiments, the flow channel 240 may have a closed configuration such that the flow channel fully contains the medium being measured as it passes through light sheet 215. In some such embodiments, the flow channel 240 may be clear/transparent, or at least translucent, to allow for the light to pass through the flow channel 240 material such that light scattered by particulates in the medium being measured can be detected. For instance, in embodiments where the medium being measured is a liquid or a gel, flow channel 240 may include a closed configuration to prevent the liquid or gel from entering the rest of system 200, and flow channel 240 may include a clear/transparent material (e.g., acrylic) to allow laser sheet beam 215 to penetrate the flow channel 240 and reach the particulate matter in the medium. Note that in some embodiments, flow channel 240, and system 200 in general, may be configured to measure any suitable medium(s), such as one or more gases, one or more liquids, and/or one or more gels, as can be understood based on this disclosure.

Medium moving device 250, in some embodiments, may include any suitable device or devices capable of moving the medium to be measured through flow channel 240 of system 200, as will be apparent in light of this disclosure. For instance, in embodiments where the medium to be measured is a gas (e.g., ambient air), the medium moving device 250 (e.g., air moving device) may include a positive air pressure device (e.g., a fan or piezoelectric diaphragm) to blow the air through flow channel 240 and/or a negative air pressure device (e.g., a reverse fan or vacuum) to suction the air through flow channel 240, for example. In embodiments where the medium to be measured is a liquid (e.g., water) or a gel (e.g., hydrogel), the medium moving device may include a pump to move the liquid or gel away from the pump and through flow channel 240 and/or a suction pump to move the liquid toward the pump and through flow channel 240, for example. In some embodiments, the flow rate of the medium through flow channel 240 may be based on the flow channel 240 size (e.g., the cross-section geometry and/or the length), the capabilities/settings of the medium moving device 250, the thickness of the laser sheet beam 215, and/or the capabilities (e.g., bandwidth/speed) of light sensor 220 and electronic circuitry 260 to measure particulate matter as it passes through light beam 215. As will be apparent in light of this disclosure, in some embodiments, one or more components of system 200 will be at least partially contained in housing 210. In some such embodiments, the medium moving device 250 may be completely outside of housing 210 (and only operatively coupled to flow channel 240), or the medium moving device 250 may be partially contained inside of housing 210, or the medium moving device may be completely contained inside of housing 210.

In some embodiments, medium moving device 250 and/or flow channel 240 may be designed to prevent any unwanted recirculation of the medium inside housing 210. For instance, in the case of medium mover device 250 being an air mover device, the unwanted recirculation of air may be achieved by baffling flow, using diffuser nozzle sections, and/or using multiple air mover devices, to name a few example options. In some embodiments, medium moving device 250 may be selected such that the device 250 does not disturb and/or filter particulates in the medium being measured, for example. In some embodiments, the medium moving device 250 and/or the settings of the device 250 may be selected such that the medium flow is substantially uniform and not too turbulent to ensure accurate readings of the particulate matter in the medium. In some embodiments, the medium moving device 250 may be operatively coupled to electronic circuitry 260, such that circuitry 260 controls the operation of medium moving device 250, such as the settings of the device 250 (e.g., the device 250 flow rate), when the device 250 is turned on/off, and so forth. In some such embodiments, electronic circuitry 260 may also monitor the medium moving device 250 to ensure, for example, proper operation of the device 250.

Light sensor 220, in some embodiments, may include any suitable device or devices capable of detecting light, such as light scattered as particulate matter crosses through flat-top intensity laser sheet beam 215, for example. For instance, in some embodiments, light sensor may include one or more photodetectors, image sensors, CMOS sensors, and/or any other suitable light sensors, as will be apparent in light of this disclosure. Light sensor 220 can be positioned in system 200 (e.g., within housing 210) to collect scattered light as particulates in the medium being measured move in flow channel 240 and pass through laser sheet beam 215. As shown in FIG. 5A, light sensor 220 will detect or collect scattered light in an angle range 222. In some embodiments, the detection angle range 222 will depend on the wavelength of the light 115 and the optics 120, 130 used for the beam shaping to form flat-top intensity laser sheet beam 215 in order to have suitable correlation between the size of particulates being measured and the light sensor 220 signal, for example. The position of light sensor 220 may also affect the angle range 222 able to be captured from the scattered light, in some embodiments. For instance, in the example system 200 shown in FIGS. 5A-B and 6, an optional lens 225 is included to collect the scattered light and redirect it to light sensor 220, such that the maximum angle range 222 of the scattered light can be detected. In some embodiments, optional lens 225 (where present) may include one or more suitable lenses, such as aspherical, spherical, biconvex, and/or cylindrical lenses, to name a few examples.

In some embodiments, other configurations may be used to direct light scattered by particulate matter to the light sensor 220, such as a configuration using one or more mirrors, for example. In some such embodiments that use additional items to redirect the scattered light may include such a configuration when the size and/or packaging of light sensor 220 may interfere with the light collection, such as if the light sensor 220 package is large enough to interfere with the beam 215 after the flow channel 240, the light sensor may need to be located farther from the flow channel 240 (e.g., as is the case shown in FIG. 5A). Further, in some such embodiments, the use of additional items (e.g., one or more mirrors and/or lenses) to redirect scattered light may enable additional size reduction to the overall system due to the flexibility gained in moving the position of the light sensor 220, which may also lead to cost savings for the overall system 200, for example. Further still, in some such embodiments, the use of additional items (e.g., optional lens 225) can focus the scattered light into a smaller angular area (e.g., as shown in FIG. 5A), thereby allowing the size of light sensor 220 to be reduced, for example. However, in some embodiments, light sensor 220 may directly receive light scattered by particulate matter without any intervening lenses or mirrors or other objects, for example. Therefore, in some such embodiments, optional lens 225 (and/or any other intervening items as described herein) need not be present.

Housing 210, in some embodiments, may be included in system 200 to contain at least a portion of the components of the system 200. For instance, in some embodiments, any or all of the laser diode 110, first lens 120, second lens 130, flow channel 240, medium moving device 250, optional lens 225 (and/or any other intervening items between flow channel 240 and light sensor 220), light sensor 220, electronic circuitry 260, and/or beam block 230 (and/or any other components used to address light beam 215 after it passes by flow channel 24), whether in part or entirely, may be contained in housing 210. In some embodiments, all or substantially all of the components may be included in housing 210, allowing for housing 210 to contain system 200, thereby enabling portable and/or wearable applications, for example. In some embodiments, housing 210 may be formed of any suitable material(s), such as one or more plastics/polymers and/or metal, to name a few example materials. In some embodiments, the dimensions of housing 210 may be less than 50 mm by 30 mm by 30 mm (e.g., less than approximately 30 mm by 20 mm by 15 mm), or some other suitable size, as will be apparent in light of this disclosure. In some embodiments, the total volume of housing 210 may be less than 50 cm$^3$ (e.g., less than 10 cm$^3$), or less than some other suitable threshold volume, as will be apparent in light of this disclosure. As can be understood by this disclosure, the small volume or form factor of system 200 and housing 210 may be achieved due to the short working distances and small size of the components used to generate a flat-top intensity laser sheet beam as described herein. In some embodiments, housing 210 may include multiple parts configured to assemble to form the housing 210. For instance, in some such embodiments, housing 210 may include a first portion configured to removably engage a second portions, such that a user can install the components of system 200 (e.g., laser diode 110, first lens 120, second lens 130, and so forth) in one of the first and second portions of the housing 210 before engaging the two housing portions 210, for example.

In some embodiments, housing 210 may be designed to assist with the PM measurement techniques described herein. For instance, in some embodiments, housing 210 may be opaque to block light external to housing 210 and prevent false readings from ambient light changes, for example. Further, in some embodiments, ambient light may also or alternatively be filtered using, for example, analog and/or digital notch filtering (e.g., to reject 50/60 Hz interference from external light sources), or any other suitable techniques as will be apparent in light of this disclosure. Further still, in some embodiments, the thickness of light sheet 215 may be selected to ensure that particulate crossings happen relatively quickly compared to ambient light changes, such that the electronic circuitry 260 can disregard light pulses with pulse widths larger than anticipated particulate crossing time. Such pulse duration based data analysis can also determine the operating suitability of light sensor 220, thereby providing alerts for maintenance or replacement, for example. For instance, some issues that can be detected by pulse duration deviations include, but are not limited to, medium movement out of spec, flow channel damage, flow channel blockage, mechanical housing damage, and laser diode operation suitability, just to name a few examples. In some embodiments, external light may not cause an issue with system 200, such as in embodiments where the light 115, 215 is infrared light, for example. In some embodiments, housing 210 may include internal features to minimize internal reflections (such as beam block 230), such that any internal reflections do not saturate the light sensor 220, for example. In some embodiments, housing 210 may be airtight or substantially airtight to help prevent external air from entering the housing 210, which may affect PM measurement readings. As can be understood based on this disclosure, the housing being airtight is in locations excluding the flow channel 240, such that the housing can be airtight but still, include a flow channel input and output, for example. Accordingly, in some such embodiments, housing 210 may be sealed using any suitable techniques to prevent undesired airflow within system 200 (where such undesired airflow is from any area other than the flow channel). In some embodiments, housing 210 may include a design to address issues that may arise based on the medium being measured. For instance, in embodiments configured to measure particulates in a gas, such as air, housing 210 may include internal features to create a uniform flow (e.g., a uniform airflow), such that particulates to not cross the laser sheet beam 215 more than once.

Optional beam block 230 may be present in some embodiments to assist with reducing or eliminating the reflection of light sheet 215 after it passes by flow channel 240, such as is shown in FIGS. 5A-B, for example. As can be understood based on this disclosure, in some embodiments, after the light sheet 215 passes through the flow channel 240, it may need to be directed, reflected, and/or absorbed in such a way that it will not scatter back into the path of light sensor 220. Thus, beam block 230 may be present, which may include a light absorptive optical device or light absorptive optical coating (which may be applied to the internal side of housing 210) that can be used to reduce the effect caused by undesired internal reflections in system 200. In some embodiments, housing 210 may reflect the undesired light to a controlled area away from the flow channel region 240, such as with the use of mirrors, for example. In some such embodiments, the undesired light may be reflected outside of housing 210 using, for example, a one-way mirror. In some embodiments, the effect from undesired internal reflections may be reduced or eliminated using filtering in the electronic circuitry 260. For instance, since the light scattering is constant and is present while the laser diode 110 is on, high pass filtering techniques and/or AC coupling techniques may be used to eliminate or reduce the effect of such undesired internal reflection, in accordance with some embodiments. This can be achieved by knowing that the light sensor 240 signal caused by undesired internal reflections will be constant (DC). In addition, in some embodiments, the DC signal can be taken out by more complicated active or dynamic DC offsetting circuit topologies, as will be apparent in light of this disclosure.

Electronic circuitry 260, in some embodiment, may be configured to convert the light sensor 220 signal into measurable voltage or current levels with amplification, for example. In some such embodiments, the conversion may include using a transimpedance amplifier topology to convert the current outputting light sensor (e.g., photodetector) signal into voltage levels. As previously described, appropriate filtering techniques (e.g., active, passive, or a combination thereof) may be used to improve the PM measurement robustness by eliminating unwanted signals that might arise from ambient light changes and/or electrical noise coupling. Measurement of analog voltage or current levels from this filtering and/or amplifying circuitry can be digitized in some embodiments using an analog-to-digital converter (which may be standalone or integrated into a microcontroller), analog or digital comparators, and/or voltage controlled oscillators, to name a few example electronic components. In some embodiments, electronic circuitry 260 may include one or more controllers (e.g., a microcontroller) and/or processors (e.g., a microprocessor) to read the values assigned to each signal corresponding to a particulate and to organize each signal into a corresponding bin, as will be described in more detail below. In some embodiments, electrical circuitry 260 may be operatively coupled to at least one of laser diode 110, medium moving device 250, and/or laser sensor 220. Accordingly, in some embodiments, electrical circuitry 260 may control at least one of laser diode 110, medium moving device 250, and/or laser sensor 220, for example. For instance, in some embodiments, electrical circuitry 260 may control laser diode 110 at a constant power or current mode of operation, including turning the diode 110 on and off. In some embodiments, electronic circuitry 260 may control medium moving device 250, such as being able to set the flow rate of the device 250 and also turn the device 250 on and off. In some embodiments, system 200 may include one or more batteries (not shown) that power one or more components of the system 200, such as the laser diode 110, the light sensor 220, the medium moving device 250, and/or the electronic circuitry 260, for example. In some embodiments, electrical circuitry 260 may include any suitable components as will be apparent in light of this disclosure, and a portion or all of the components may be contained within housing 210, for example.

Figure 7A:
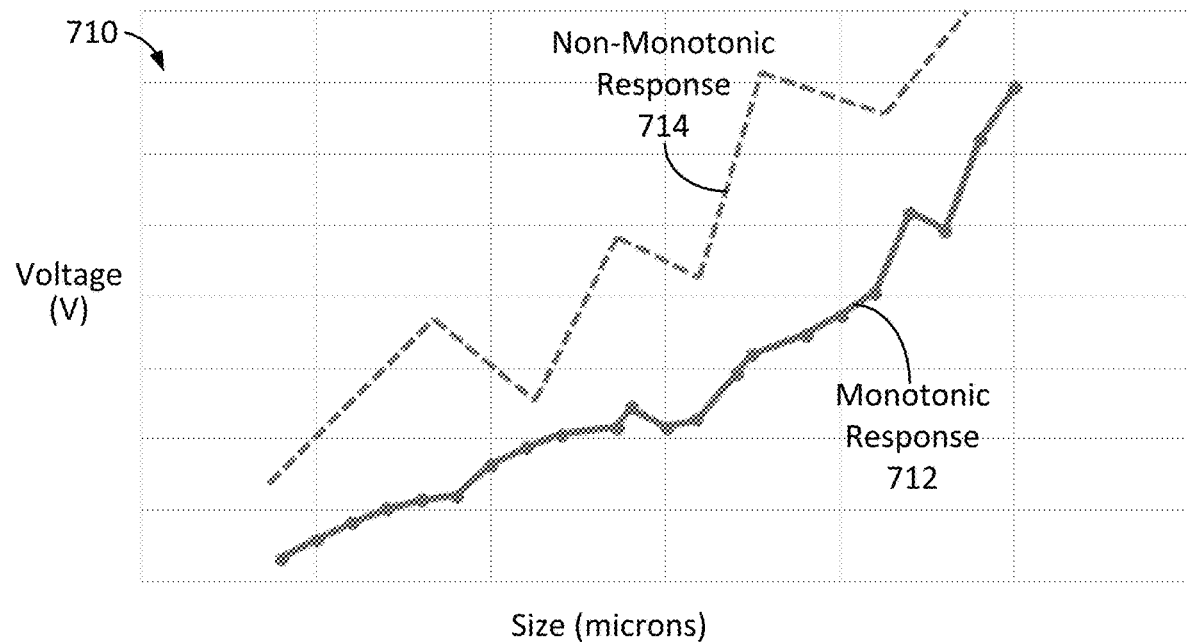
FIG. 7A illustrates light scattering plot results for light sensor signal amplitude vs. particulate size, including approximate monotonic and non-monotonic responses, using a system for particulate matter measurement as variously described herein, in accordance with some embodiments of the present disclosure.
Figure 7B:
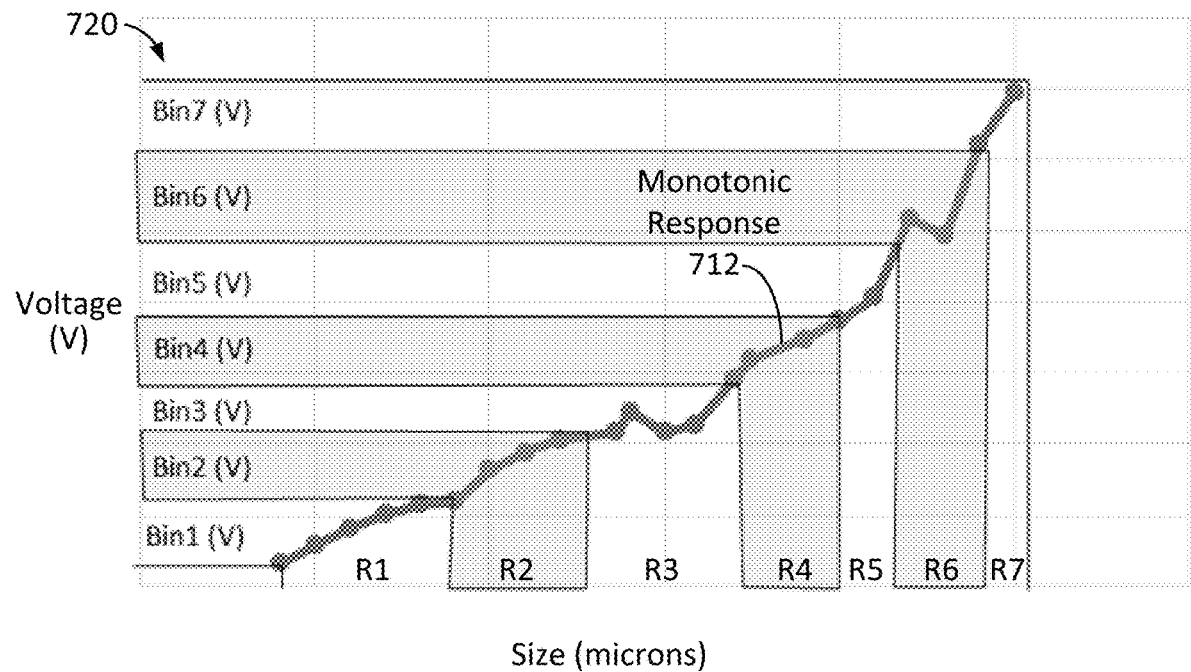
FIG. 7B illustrates the monotonic response from the plot of FIG. 7A, including organizing the data into example bins to address non-monotonic regions of the response, in accordance with some embodiments of the present disclosure.

As previously described, in some embodiments, the detection angle range 222 of scattered light will depend on the wavelength of the light 115 and the optics 120, 130 used for the beam shaping to form flat-top intensity laser sheet beam 215 in order to have suitable correlation between the size of particulates being measured and the light sensor 220 signal. In some such embodiments, system 200 may be configured such that the response of the light sensor 200 signal amplitude is first order monotonic, which can help ensure that each particulate size has only one corresponding light sensor 220 signal amplitude (e.g., at a given precision level, such as at a precision of PM0.1 or PM0.2 or PM0.5 or PM1). As can be understood based on this disclosure, in some embodiments, the scattered light follows a Mie scattering scheme. In a Mie scattering scheme, the scattered energy is dependent on the scattering angle. Because of this dependence, for some angle ranges, the relationship between particulate size and scattering energy may show a non-monotonic behavior, in some embodiments. However, in some embodiments, this may be addressed by positioning light sensor 220 in such a way that it will collect the scattered light from the smallest practical angle range to give a monotonic response (light sensor signal vs. particulate size) at a given wavelength, which may be any suitable angle range, as can be understood based on this disclosure. Such a configuration, in some embodiments may be aided using intervening items (e.g., one or more optional lenses and/or mirrors), as previously described. FIGS. 7A-B help to illustrate these concepts, which will be described in more detail below.

FIG. 7A illustrates light scattering plot results 710 for light sensor signal amplitude vs. particulate size, including approximate monotonic 712 and non-monotonic 714 responses, using a system for particulate matter (PM) measurement as described herein, in accordance with some embodiments of the present disclosure. As shown, the monotonic response 712 is first order monotonic, showing increasing light sensor 220 signal voltage as particulate size increases, in this example embodiment. As is also shown, a few nonidealities are present (which may predicted by optical theory), and such nonidealities may be minimized by effective component placement/positioning for system 200 (e.g., effective placement of light sensor 220 relative to laser sheet beam 215), as can be understood based on this disclosure. To assist with illustration of monotonic response 712, a typical non-monotonic response 714 is also included, which may occur when components in system 200 are not effectively positioned. In some embodiments, the speed of the particulates crossing the laser sheet beam 215 in the thickness direction may determine the width of the detector signal, which may be referred to as the pulse, for example. In some such embodiments, analog circuitry (e.g., included in electronic circuitry 260) may be used to amplify the relatively small light sensor 220 (e.g., photodetector) signals into measurable voltage levels, which may include a minimum pulse (light sensor 220 signal) width that the circuitry 260 can effectively amplify. As can be understood based on this disclosure, in some embodiments, the angle of scattered light correlates to the size of the particulate matter passing through light beam 215. Accordingly, in some embodiments, the maximum speed of the medium (and particulates contained therein) crossing through light sheet 215 may be adjusted based on the minimum pulse width that the circuitry 260 can effectively amplify. As can be understood based on this disclosure, the medium mover 250 flow rate in combination with the flow channel 240 geometry may govern the speed of the medium (and particulates contained therein). Thus, in some embodiments, the geometry of the flow channel 240 may be designed to allow flow of the medium (and particulates contained therein) at a target flow rate. In other words, if a threshold flow rate is desired, the geometry of flow channel 240 may be adjusted accordingly (e.g., increase or decrease the flow channel 240 diameter or other cross-sectional area) to achieve the desired flow rate. However, if the particulates travel too fast in the flow channel 240, large diameter particulates (e.g., particulate matter with diameters of greater than 5-10 microns) might get filtered due to their high momentum, making it difficult for such relatively larger diameter particulates to make the turns associated with the flow channel 240. In some embodiments, the speed of the medium in flow channel 240 may be set such that circuitry 260 is fast enough to amplify the small detector signal pulses without any attenuation. However, in some such embodiments, even if there is some attenuation, it will be a constant percentage provided that all the particulates travel at the same speed, and such attenuation can be addressed during the calibration of the system 200 (e.g., during calibration of light sensor 220). As previously described, in some embodiments, the light sensor 220 may be located within system 200 in such a manner so as to further size reduction of the overall system 200. For instance, in some embodiments, light sensor 220 may be positioned such that it has the smallest scattering angle collection range 222 possible to give a monotonic response between particulate size and detector 220 signal amplitude.

FIG. 7B illustrates the monotonic response 712 from the plot 710 of FIG. 7A, including organizing the data into example bins to address non-monotonic regions of the response 712, in accordance with some embodiments of the present disclosure. As can be understood based on this disclosure, system 200 may be calibrated based on the particular configuration of the system 200 being used. Such a calibration may be achieved, for example, using known size particulates to create a monodisperse (in size) aerosol and to read the voltage levels as the monodisperse passes through light sheet 215 and is measured using system 200 as described herein. The light sensor 220 can be calibrated to a wide variety of particulate size readings (e.g., EPA particulate matter size ranges, PM2.5, and/or PM10), in some embodiments, by changing the amplification settings and filtering data by peak height, to eliminate peaks associated with larger or smaller particulates, for example. For instance, to detect PM10, a smaller amplification setting may be used than the amplification setting that would be used for PM2.5, to provide an example case. In the case of system 200 exhibiting non-monotonic behavior, whether such behavior is throughout a majority or the entirety of its calibrated readings (e.g., as shown in non-monotonic response 714 in FIG. 7A), or whether such behavior is in some portions or regions of the particulate peak voltage vs. particulate size relationship (e.g., as shown in monotonic response 712 in FIGS. 7A-B), a binning scheme can be implemented to group the particulates within ranges that eliminates the impact of the non-monotonic behavior on the system 200 accuracy (e.g., on the sensor 220 accuracy).

As shown in plot 720 of FIG. 7B, in accordance with this example embodiment, the monotonic response 712 was organized into multiple bins to address the non-monotonic regions included therewith. In some embodiments, such non-monotonic regions may be present as a result of the components and/or configuration of system 200. Accordingly, the binning scheme illustrated in FIG. 7B can be used to address those non-monotonic regions. In this example embodiment, monotonic response 712 was analyzed and organized into seven different bins (Bin1-Bin7) representing seven different voltage ranges and corresponding to seven different particulate size ranges (R1-R7, respectively). For instance, in an example case, the voltage bins may cover a total voltage change of 5 V ranging from 5 V to 10 V and the size ranges may cover a total change of 2 microns, ranging from 0.5 microns to 2.5 microns. In such an example case, bin and size ranges may be set as listed in the table below, to provide an illustrative example of the binning scheme:

| # | Bin Voltage Range | Particulate Size Range |
|---|---|---|
| 1 | 5-5.59 V | 0.5-0.99 microns |
| 2 | 5.6-6.29 V | 1-1.39 microns |
| 3 | 6.3-6.59 V | 1.4-1.79 microns |
| 4 | 6.6-7.39 V | 1.8-1.99 microns |
| 5 | 7.4-8.09 V | 2-2.09 microns |
| 6 | 8.1-9.29 V | 2.1-2.39 microns |
| 7 | 9.3-10 V | 2.4-2.5 microns |

As can be understood based on this disclosure, each time a voltage peak is observed by system 200 when measuring particulate matter in a medium, the voltage peak can be recorded, which corresponds to a specific particulate size or size range. As can also be understood based on this disclosure, after the measuring for a given time period is complete, the number of voltage peaks at a given level can be determined to obtain the total number of particulates measured in that given time period per particulate size or size range. For instance, using the example table above, if ten voltage peaks of 5.2, 5.3, 6.8, 5.1, 6.5, 6.5, 7.6, 5.3, 5.8, and 5.4 V were recorded for a given time period, then the corresponding sizes and number of particles measured would include five particles in the 0.5 to 0.99 micron size range (R1), one particle in the 1 to 1.39 micron size range (R2), two particles in the 1.4 to 1.79 micron size range (R3), one particle in the 1.8 to 1.99 micron size range (R4), and one particle in the 2 to 2.09 micron size range (R5), to provide one example case. Note that only ten readings were given in the previous example for ease of illustration; however, in some embodiments, measurements may include tens, hundreds, thousands, or more particulate readings, for example. In some embodiments, such a binning scheme need not be used, such that measured scattered light (e.g., in the form of voltage peaks) may have direct correlations to single particle sizes (or size ranges). In some embodiments, the concentration of one or more of the measured particulate matter sizes (which may include all of the particulate matter measured) may be determined based on the flow rate of the medium in combination with the flow channel 240 geometry and the measuring time to determine how much volume of the medium has passed through while measuring the particulate matter contained therein.

In the context of using the PM measurement system 200 to take samples of a medium (such as air) for PM level measurements, electronic circuitry 260 may control components of system 200 such that the device samples at normal intervals, such as every five seconds, every minute, every five minutes, every ten minutes, or any other suitable increment, as can be understood in light of this disclosure. In some embodiments, the system 200 may sample the medium (such as air) for PM level measurements at random times. In some embodiments, system 200 may include a more intelligent duty cycle. For instance, in the case of measuring PM levels in air, in some such embodiments, system 200 may be able to determine when the system has been moved, such as by using accelerometers, gyroscopic sensors, and/or locationing/positioning devices that may be included with or operatively coupled to system 200. In some such embodiments, system 200 may be able to detect movement based on changes to nearby radio signals, such as from cell towers (e.g., 3G/4G/5G signals), Wi-Fi hotspots, or devices configured to receive and/or transmit radio signals (e.g., smart phones, tablets, and other computing devices). In some embodiments, lower overall power consumption may be achieved in system 200, by co-designing the beam shaping generation with the flow channel and electronic circuitry to achieve efficient particulate detection with size information. Further, in some embodiments, power efficiency can be adjusted by enhancing tradeoffs between factors including, but not limited to, thickness of the light sheet vs. medium/particulate speed, light sheet width vs. flow channel geometry, light source power vs. light sensor coverage angle range, light source wavelength vs. light sensor coverage range. For example, such tradeoffs may be addressed by the following: having the light sheet width be greater than the flow channel width or diameter to ensure up to 100% particulate counting efficiency, co-designing the analog electronic bandwidth with the particulate crossing time (where the particulate crossing time depends on the light sheet geometry and flow characteristics), performing sensor health checks based on pulse width, including methods for adsorption or filtering of unwanted internal reflections, and other suitable techniques as can be understood based on this disclosure. Numerous variations and configurations will be apparent in light of this disclosure.

Various embodiments can be implemented using hardware elements, software elements, or a combination of both. Examples of hardware elements includes processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article or computer program product which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language. Some embodiments may be implemented in a computer program product that incorporates the functionality of the particulate matter measurement techniques, as variously disclosed herein, and such a computer program product may include one or more machine-readable mediums or be operated by one or more processors, for example.

Unless specifically stated otherwise, it will be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays.

FURTHER EXAMPLE EMBODIMENTS

The following examples pertain to further embodiments, from which numerous permutations and configurations will be apparent.

Example 1 is a system for particulate matter measurement, the system including: a source of light; a first optical component for receiving the light and generating light being substantially collimated; a second optical component for focusing the collimated light in a first plane, thereby providing a light sheet; a medium flow channel to pass a medium through the light sheet; and a light sensor configured to detect light scattered by particulate matter in the medium.

Example 2 includes the subject matter of Example 1, wherein the source of light is a laser diode.

Example 3 includes the subject matter of any of Examples 1-2, wherein the first plane is perpendicular to a second plane, and the first optical component is further configured for generating spherical aberration resulting in positive aberrations in the light in the second plane in addition to resulting in the light being substantially collimated in the first plane, wherein the source of light has a larger divergence angle output in the second plane than in the first plane.

Example 4 includes the subject matter of Example 3, wherein the spherical aberration is third order positive aberration.

Example 5 includes the subject matter of any of Examples 1-4, wherein the source of light approximates a Gaussian profile.

Example 6 includes the subject matter of any of Examples 1-5, wherein the source of light operates in the TEM00 mode.

Example 7 includes the subject matter of any of Examples 1-6, wherein the first optical component is an aspherical lens.

Example 8 includes the subject matter of Example 7, wherein the aspherical lens has an aspherical side, and wherein the aspherical side faces the source of light.

Example 9 includes the subject matter of any of Examples 1-6, wherein the first optical component is one of a spherical and biconvex lens.

Example 10 includes the subject matter of any of Examples 1-9, wherein the second optical component is a cylindrical lens.

Example 11 includes the subject matter of any of Examples 1-10, wherein the light sheet includes a flat-top intensity laser sheet beam profile.

Example 12 includes the subject matter of any of Examples 1-11, wherein the medium is at least one of a gas, air, liquid, and gel.

Example 13 includes the subject matter of any of Examples 1-12, wherein the medium flow channel is part of an air mover device configured to move air through the light sheet using at least one of positive and negative air pressure.

Example 14 includes the subject matter of any of Examples 1-13, wherein the light sensor includes at least one photodetector configured to detect the scattered light.

Example 15 includes the subject matter of any of Examples 1-14, further including electronic circuitry configured to receive signals from the light sensor and further configured to control at least one of the light source and a flow rate of the medium flow channel.

Example 16 includes the subject matter of any of Examples 1-15, further including a housing containing at least one of the source of light, the first optical component, the second optical component, the medium flow channel, and the light sensor.

Example 17 includes the subject matter of any of Examples 1-16, wherein the system can effectively measure particulate matter having a diameter in the range of 0.3 to 10 microns.

Example 18 is a system for particulate matter measurement, the system including: a laser diode configured to provide light; an aspherical lens having an aspheric side and arranged to receive the light from the laser diode, wherein the aspheric side faces the laser diode; a cylindrical lens arranged to receive the light from the aspherical lens to generate a flat-top intensity laser sheet beam; a device configured to move air through a flow channel; and a light sensor configured to detect light scattered by particulate matter in the air as the particulate matter passes through the laser sheet beam.

Example 19 includes the subject matter of Example 18, wherein the light sensor includes at least one photodetector configured to detect the scattered light.

Example 20 includes the subject matter of any of Examples 18-19, further including electronic circuitry configured to receive signals from the light sensor and further configured to control at least one of the laser diode and the device configured to move air through the flow channel.

Example 21 includes the subject matter of any of Examples 18-20, further including a housing containing at least one of the laser diode, the aspherical lens, the cylindrical lens, the device configured to move air through the flow channel, and the light sensor, wherein the housing has a volume of less than 50 cm$^3$.

Example 22 includes the subject matter of Example 21, wherein the housing is opaque and airtight in areas unrelated to the flow channel.

Example 23 includes the subject matter of any of Examples 18-22, wherein the system can effectively measure particulate matter having a diameter in the range of 0.3 to 10 microns.

Example 24 includes the subject matter of any of Examples 18-23, wherein the system can effectively distinguish between a first particulate matter and a second particulate matter, the first particulate matter diameter being less than 0.25 microns different than the second particulate matter diameter.

Example 25 includes the subject matter of any of Examples 18-24, further including a battery for powering at least one of the laser diode and the device configured to move air through the flow channel.

Example 26 includes the subject matter of any of Examples 18-25, wherein the light sensor is configured to detect light scattered in such a way so as to get a monotonic response for a relationship between particulate matter size and scattering angle.

Example 27 includes the subject matter of any of Examples 18-26, wherein the laser sheet beam has a width greater than a width of the flow channel, such that substantially all of the particulate matter passes through the laser sheet beam as the air passes through the laser sheet beam.

Example 28 is a method of particulate matter measurement, the method including: providing a source of light; directing the source of light toward a first optical component, resulting in the light being substantially collimated; directing the light from the first optical component toward a second optical component for focusing the collimated light in a plane, thereby providing a light sheet; moving a medium through the light; and detecting light scattered by particulate matter in the medium.

Example 29 includes the subject matter of Example 28, wherein the source of light is a laser diode.

Example 30 includes the subject matter of any of Examples 28-29, wherein the first optical component is an aspherical lens.

Example 31 includes the subject matter of Example 30, wherein the aspherical lens has an aspherical side, and wherein the aspherical side faces the source of light.

Example 32 includes the subject matter of any of Examples 28-29, wherein the first optical component is one of a spherical and biconvex lens.

Example 33 includes the subject matter of any of Examples 28-32, wherein the second optical component is a cylindrical lens.

Example 34 includes the subject matter of any of Examples 28-33 wherein focusing the light in the plane generates a flat-top intensity laser sheet beam.

Example 35 includes the subject matter of any of Examples 28-34, wherein the medium is at least one of a gas, air, liquid, and gel.

Example 36 includes the subject matter of any of Examples 28-35, wherein the medium is moved through the light using at least one of positive and negative air pressure.

Example 37 includes the subject matter of any of Examples 28-36, wherein the light sensor includes at least one photodetector configured to detect the scattered light.

Example 38 includes the subject matter of any of Examples 28-37, further including converting signals received from the light sensor to voltage levels.

Example 39 includes the subject matter of Example 38, wherein the voltage levels are organized into bins that correspond to at least one of a particulate matter size and a particulate matter size range.

Example 40 includes the subject matter of any of Examples 28-39, further including calculating particulate matter concentration in the medium.

Example 41 is a computer program product including one or more non-transitory machine readable mediums each encoded with instructions that when executed by one or more processors cause a process to be carried out for particulate matter measurement, the process including: receiving scattered light detection signals resulting from moving a medium through a light sheet, the light sheet generated by an optical component configured to focus collimated light in a plane, wherein particulate matter in the medium causes scattered light as that particulate matter passes through the light sheet; and determining particle sizes included in the particulate matter based on the received scattered light detection signals.

Example 42 includes the subject matter of Example 41 wherein determining particle sizes included in the particulate matter based on the received scattered light detection signals includes organizing the scattered light detection signals in different voltage bins, each voltage bin corresponding to a particle diameter size range.

Example 43 includes the subject matter of any of Examples 41-42, wherein the process further includes determining particle levels in the medium based on the received scattered light detection signals.

Example 44 includes the subject matter of Example 43 wherein determining particle levels in the medium based on the received scattered light detection signals includes determining how many particles of a given size range have crossed the light sheet.

Example 45 includes the subject matter of any of Examples 41-44, the process further including filtering out reflected light from the light sheet that returns to a location where particulate matter passes through the light sheet.

The foregoing description of example embodiments has been presented for the purposes of illustration and description. This description is not intended to be exhaustive or to limit the present disclosure to the precise forms disclosed. Many modifications and variations are possible in light of this disclosure. This disclosure does not intend to limit the scope of the various embodiments. Future filed applications claiming priority to this application may claim the disclosed subject matter in a different manner, and may generally include any set of one or more limitations as variously disclosed or otherwise demonstrated herein.

What is claimed is:

1. A system for particulate matter measurement, the system comprising:
   a source of light;
   an aspherical lens having an aspheric side for receiving the light directly from the source of light;
   a second optical component for focusing the light in a first plane, thereby providing a light sheet, wherein the first plane is perpendicular to a second plane, the second plane parallel to the light sheet, and the aspherical lens is further configured to generate spherical aberration resulting in positive aberrations in the light in the second plane in addition to resulting in the light being substantially collimated in the first plane, wherein the source of light has a larger divergence angle output in the second plane than in the first plane;
   a medium flow channel to pass a medium through the light sheet; and
   a light sensor configured to detect light scattered by particulate matter in the medium.

2. The system of claim 1, wherein the source of light is a laser diode.

3. The system of claim 1, wherein the spherical aberration is third order positive aberration.

4. The system of claim 1, wherein the source of light approximates a Gaussian profile.

5. The system of claim 1, wherein the aspherical lens is a biconvex lens.

6. The system of claim 1, wherein the second optical component is a cylindrical lens.

7. The system of claim 1, wherein the light sheet includes a flat-top intensity laser sheet beam profile.

8. The system of claim 1, wherein the medium flow channel is part of an air mover device configured to move air through the light sheet using at least one of positive and negative air pressure.

9. The system of claim 1, wherein the light sensor includes at least one photodetector configured to detect the scattered light.

10. A system for particulate matter measurement, the system comprising:
a laser diode configured to provide light;
an aspherical lens having an aspheric side and arranged to receive the light directly from the laser diode, wherein the aspheric side faces the laser diode;
a cylindrical lens arranged to receive the light from the aspherical lens to generate a flat-top intensity laser sheet beam in a first plane, wherein the first plane is perpendicular to a second plane, the second plane parallel to the laser sheet beam, and the aspherical lens is further configured to generate spherical aberration resulting in positive aberrations in the light in the second plane in addition to resulting in the light being substantially collimated in the first plane, wherein the laser diode has a larger divergence angle output in the second plane than in the first plane;
a medium moving device configured to move a flowable medium through a flow channel; and
a light sensor configured to detect light scattered by particulate matter in the flowable medium as the particulate matter passes through the laser sheet beam.

11. The system of claim 10, further comprising a housing containing at least one of the laser diode, the aspherical lens, the cylindrical lens, the flowable medium moving device configured to move the flowable medium through the flow channel, and the light sensor, wherein the housing has a volume of less than 50 cm$^3$.

12. The system of claim 11, wherein the housing is opaque and airtight in areas unrelated to the flow channel.

13. The system of claim 10, wherein the system can effectively measure particulate matter having a diameter in the range of 0.3 to 10 microns.

14. The system of claim 10, wherein the system can effectively distinguish between a first particulate matter and a second particulate matter, the first particulate matter diameter being less than 0.25 microns different than the second particulate matter diameter.

15. The system of claim 10, wherein the laser sheet beam has a width greater than a width of the flow channel, such that substantially all of the particulate matter passes through the laser sheet beam as the flowable medium passes through the laser sheet beam.

16. A method of particulate matter measurement, the method comprising:
providing a source of light;
directing the source of light toward an aspherical lens having an aspheric side, the aspheric side receiving the light from the source;
directing the light from the aspherical lens toward a second optical component for focusing the light in a first plane, thereby providing a light sheet, wherein the first plane is perpendicular to a second plane, the second plane parallel to the light sheet, and the aspherical lens further generates spherical aberration resulting in positive aberrations in the light in the second plane and in the light being substantially collimated in the first plane, wherein the source of light has a larger divergence angle output in the second plane than in the first plane;
moving a medium through the light; and
detecting light scattered by particulate matter in the medium.

17. The method of claim 16, further comprising generating signals in response to detecting the scattered light and converting the signals to voltage levels.

18. The method of claim 17, wherein the voltage levels are organized into bins that correspond to at least one of a particulate matter size and a particulate matter size range.

19. The method of claim 16, further comprising calculating particulate matter concentration in the medium.

20. A computer program product including one or more non-transitory machine readable mediums each encoded with instructions that when executed by one or more processors cause a process to be carried out for particulate matter measurement, the process comprising:
receiving scattered light detection signals resulting from moving a medium through a light sheet, the light sheet generated by an aspheric lens having an aspheric side that directly receives light from a light source, and a cylindrical lens that receives the light from the aspheric lens and focuses the light in a first plane, wherein the first plane is perpendicular to a second plane, the second plane parallel to the light sheet, and the aspherical lens further generates spherical aberration resulting in positive aberrations in the light in the second plane and in the light being substantially collimated in the first plane, wherein light received by the aspheric lens from the light source has a larger divergence angle output in the second plane than in the first plane, and wherein particulate matter in the medium causes scattered light as that particulate matter passes through the light sheet; and
determining particle sizes included in the particulate matter based on the received scattered light detection signals.

21. The computer program product of claim 20 wherein determining particle sizes included in the particulate matter based on the received scattered light detection signals includes organizing the scattered light detection signals in different voltage bins, each voltage bin corresponding to a particle diameter size range.

22. The computer program product of claim 20, wherein the process further comprises determining particle levels in the medium based on the received scattered light detection signals.

23. The system of claim 10, wherein the flowable medium is air or other gas.

24. The system of claim 10, wherein the flowable medium is a fluid.

25. The system of claim 1, further comprising a housing containing at least one of the source of light, the aspherical lens, the second optical component, the medium flow channel, and the light sensor, wherein the housing has a volume of less than 50 cm$^3$.

* * * * *